(12) United States Patent
Shimaoka et al.

(10) Patent No.: US 6,940,544 B2
(45) Date of Patent: Sep. 6, 2005

(54) CAMERA OPERATING APPARATUS

(75) Inventors: Takayuki Shimaoka, Yokohama (JP); Takao Koishi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 963 days.

(21) Appl. No.: 09/886,879

(22) Filed: Jun. 21, 2001

(65) Prior Publication Data

US 2002/0001034 A1 Jan. 3, 2002

(30) Foreign Application Priority Data

Jun. 21, 2000 (JP) ........................................ 2000-186526

(51) Int. Cl.$^7$ .......................... H04N 5/232; H04N 5/225
(52) U.S. Cl. .............................. 348/211.7; 348/207.11; 348/375; 200/329; 200/6 A
(58) Field of Search .......................... 348/211.4–211.7, 348/207.11, 375, 207.99; 200/5 A, 6 A, 329; 318/568.1

(56) References Cited

U.S. PATENT DOCUMENTS

| 5,430,511 A | * | 7/1995 | Paff et al. .................. 396/427 |
| 5,745,166 A | * | 4/1998 | Rhodes et al. .............. 348/143 |
| 5,801,770 A | * | 9/1998 | Paff et al. ................ 348/211.5 |
| 5,973,471 A | * | 10/1999 | Miura et al. ............... 318/640 |
| 6,392,693 B1 | * | 5/2002 | Wakiyama et al. .......... 348/143 |
| 6,744,461 B1 | * | 6/2004 | Wada et al. ................ 348/143 |

* cited by examiner

Primary Examiner—Ngoc-Yen Vu
Assistant Examiner—Hung Lam
(74) Attorney, Agent, or Firm—Pearne & Gordon LLP

(57) ABSTRACT

A camera operating apparatus for operating at least one camera unit at first and second operation speeds and at an operation direction which are to be changed by an operator, comprises a retainer having an operation surface, a joystick mounted on the retainer and having a center axis and a center point located on the center axis, the joystick being pivotable around the center point of the joystick at a variable inclination angle between the center axis of the joystick and the operation surface of the retainer to input a first speed signal indicative of the inclination angle varied in response to the first operation speed to the camera unit, a plurality of keys each operatively arranged on the retainer to perform a key-pushed action and a key-released action, each of the keys being operative to input a key signal indicative of the key-pushed action, the keys including one specified key selected for the second operation speed to the camera unit desired by the operator, and output signal generating means for generating a second speed signal indicative of the second operation speed to the camera unit based on the first speed signal from the joystick and the key signal from the specified key, the output signal generating means being operative to output the second speed signal to the camera unit to ensure the second operation speed to the camera unit desired by the operator.

13 Claims, 11 Drawing Sheets

FIG.4

| INCLINATION ANGLE | OPERATION SPEED |
|---|---|
| A | 0 |
| B | 1 |
| C | 2 |
| D | 3 |
| E | 4 |
| F | 5 |
| G | 6 |
| H | 7 |
| I | 8 |

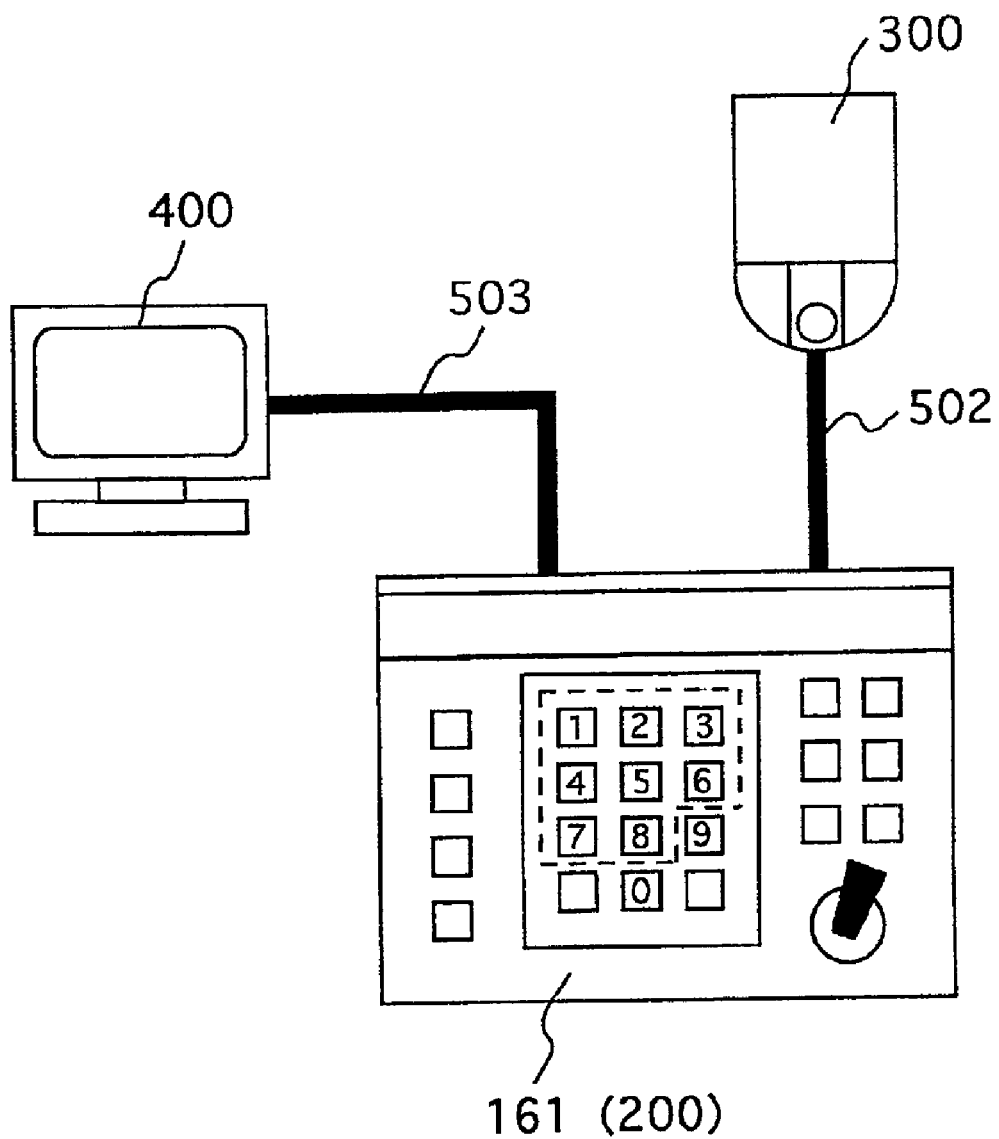

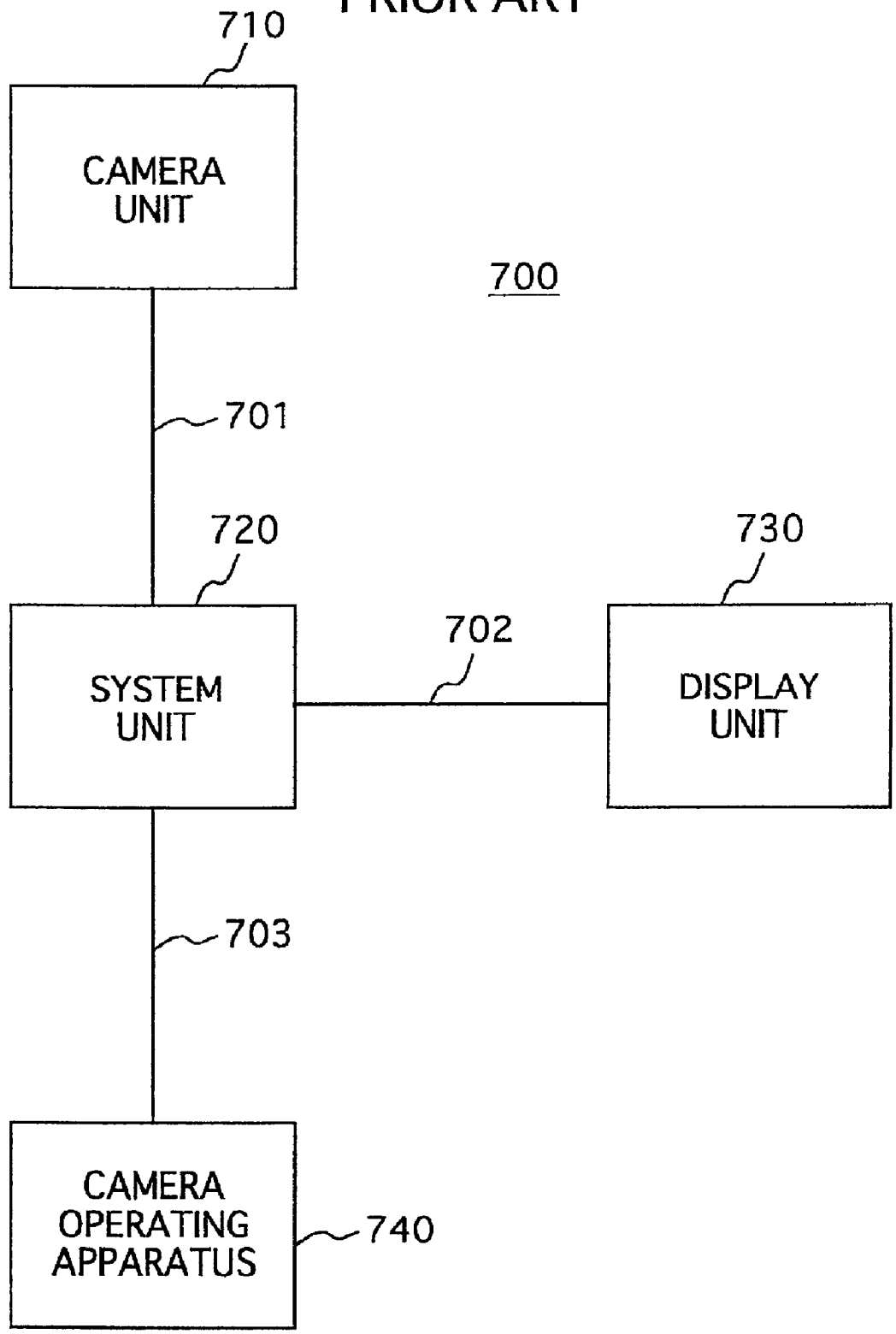

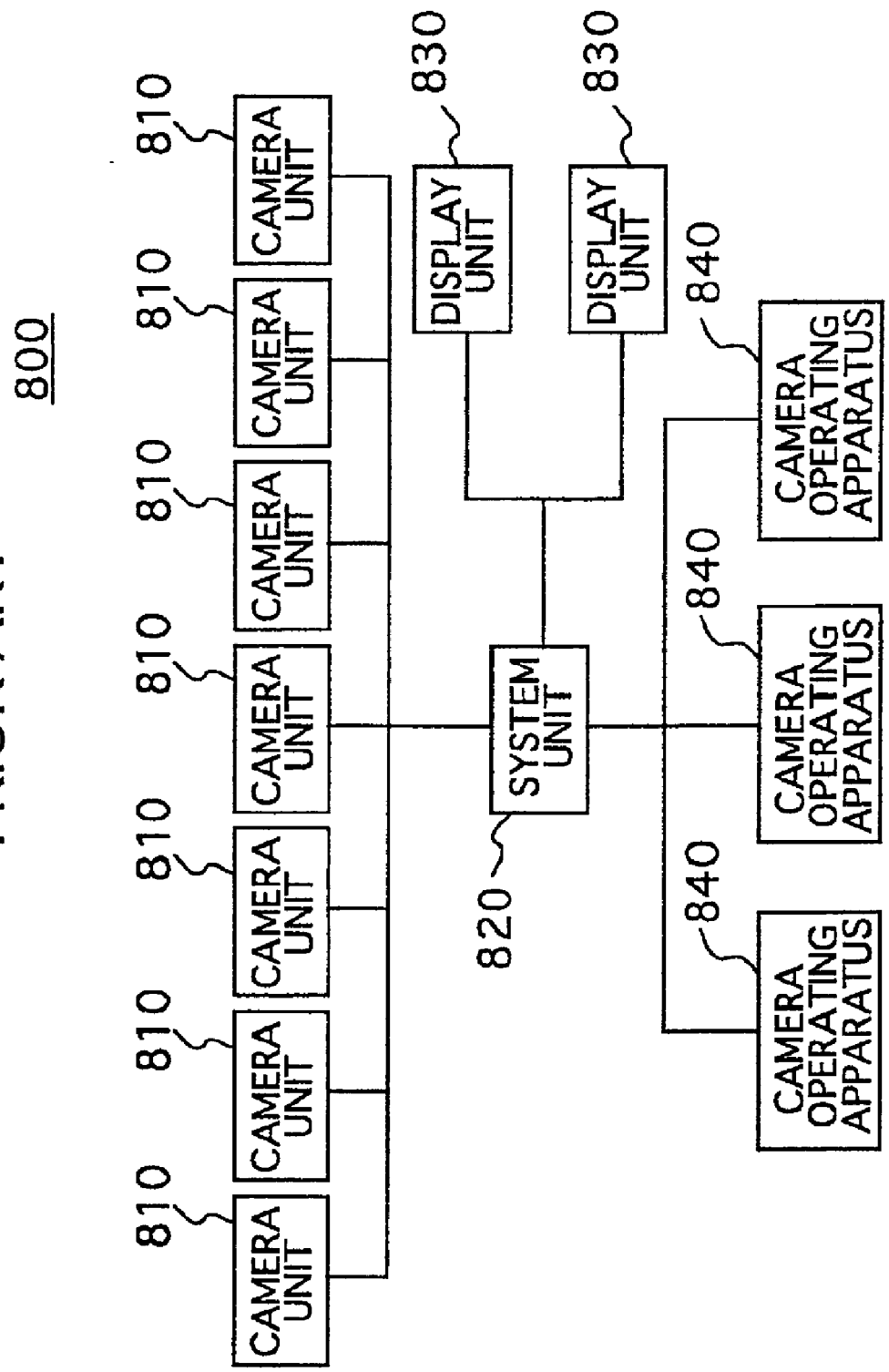

CAMERA OPERATING APPARATUS

BACKGROUND OF THE INVENTION

1. Field of the Invention

The present invention relates to a camera operating apparatus available for a surveillance system, and more particularly to a camera operating apparatus equipped with a joystick to operate at least one camera unit at an operation speed and at an operation direction which are to be changed by an operator.

2. Description of the Related Art

Up until now, there have been proposed a wide variety of conventional camera operating apparatuses each equipped with a joystick to operate at least one camera unit at an operation speed and at an operation direction which are to be changed by an operator.

The conventional camera operating apparatuses of this type have so far been used for such a surveillance system available for watching unqualified people and other intruders intruding into a special room which does not permit people with any permission from entering. One typical example of the conventional camera operating apparatuses is shown in FIG. 10 as being provided in combination with a prior-art surveillance system 700 which comprises a camera unit 710, a system unit 720 for controlling an operation speed and an operation direction to the camera unit 710, a display unit 730 for displaying an image taken by the camera unit 710, and the camera operating apparatus 740 for operating the camera unit 710 at the operation speed and at the operation direction which are to be changed by the operator in response to operation commands inputted therein. The system unit 720 is electrically connected to the camera unit 710, the display unit 730 and the camera operating apparatus 740 through signal transmitting lines 701, 702 and 703, respectively.

Description will now be made on how the image taken by the camera unit 710 is displayed on the screen of the display unit 730.

When the camera unit 710 is operated to take an image to be displayed on the screen of the display unit 730, the camera unit 710 is firstly driven by the camera operating apparatus 740 to transform the image into an image signal outputted to the signal transmitting line 701. The image signal thus outputted to the signal transmitting line 701 is then transmitted to a system unit 720 before being inputted to the display unit 730.

The image signal is then transformed into an image to be displayed on the screen of the display unit 730.

In order to have the camera unit 710 operated by the operation commands of the camera operating apparatus 740 to photograph an image, the camera operating apparatus 740 is operated to receive the operation commands respectively indicative of the photographing directions, magnifications and the like inputted by the operator while he or she is watching the screen of the display unit 730. The camera operating apparatus 740 inputted with the operation commands is then operated to transform the operation commands into a command signal to be transmitted to the signal transmitting line 703. The command signal thus transmitted to the signal transmitting line 703 is then inputted to the system unit 720 where the command signal is then transformed into a drive signal to drive the camera unit 710 to be outputted to the camera unit 710 by way of the signal transmitting line 701. The camera unit 710 thus received the drive signal from the system unit 720 is at this time operated to change the photographing directions, magnifications and the like into new ones.

As will be seen from the above, there has been described only one camera unit 710 provided in combination with the system unit 720, the display unit 730, the camera operating apparatus 740 in the conventional surveillance system 700 for the purpose of simplifying the description and assisting in understanding about the whole operation of the surveillance system.

In reality, such a conventional surveillance system 800, however, is as shown in FIG. 11 to comprise a plurality of camera units 810, a system unit 820, a plurality of display units 830, and a plurality of camera operating apparatuses 840. The conventional surveillance system 800 thus constructed allows the operator to selectively operate those camera operating apparatuses 840 to input to camera operating apparatuses 840 operation commands indicative of selecting one or more camera units 810 and one or more display units 830. This leads to the fact that the operator can select one or more camera operating apparatuses 840 not only to have the image displayed on the screen of one or more display units 830 in accordance with the image taken by one or more selected camera units 810 but to operate the camera units 810 under the operation states optioned by the operator.

Here, as the camera operating apparatus 840 forming part of the conventional surveillance system is used a CCTV (Closed Circuit Television) type of camera operating apparatus which is hereinafter referred simply to "a camera operating apparatus". The camera operating apparatus used heretofore is generally equipped with a joystick designed to input operation commands by the operator to ensure that a camera unit is operated under various operation states changed in photographing directions, magnifications and the like. Such a joystick is usually pivotable at a variable inclination angle to input the operation command indicative of the inclination angle varied in response to the operation speed to the camera unit and at a variable inclination direction to input the operation command indicative of the inclination direction varied in response to the operation direction to the camera unit.

The conventional camera operating apparatus, however, encounters such a problem that the operation speed and the operation direction of the camera unit are changed in response to the inclination angle and the inclination direction of the joystick, resulting from the fact that it is difficult for the operator to minutely change the operation speed and the operation direction of the camera unit only by operating the joystick.

SUMMARY OF THE INVENTION

It is, therefore, an object of the present invention to provide a camera operating apparatus which facilitates to minutely change the operation speed and the operation direction of the camera unit.

In accordance with a first aspect of the present invention, there is provided a camera operating apparatus for operating at least one camera unit at first and second operation speeds and at an operation direction which are to be changed by an operator, comprising: a retainer having an operation surface; a joystick mounted on the retainer and having a center axis and a center point located on the center axis, the joystick being pivotable around the center point of the joystick at a variable inclination angle between the center axis of the joystick and the operation surface of the retainer to input a first speed signal indicative of the inclination angle varied in response to the first operation speed to the camera unit; a plurality of keys each operatively arranged on the retainer to perform a key-pushed action and a key-released action, each of the keys being operative to input a key signal indicative of the key-pushed action, the keys including one specified key selected for the second operation speed to the camera unit desired by the operator; and output signal generating means for generating a second speed signal indicative of the second operation speed to the camera unit based on the first speed signal from the joystick and the key signal from the specified key, the output signal generating means being operative to output the second speed signal to the camera unit to ensure the second operation speed to the camera unit desired by the operator.

The second speed signal generated by the output signal generating means may indicate an operation speed to the camera unit which is equal to an operation speed to the camera unit decided by the key signal inputted from the specified key.

In accordance with a second aspect of the present invention, there is provided a camera operating apparatus for operating at least one camera unit at first and second operation directions and at an operation speed which are to be changed by an operator, comprising: a retainer having an operation surface; a joystick mounted on the retainer and having a center axis and a center point located on the center axis, the joystick being pivotable around the center point of the joystick at a variable inclination direction with respect to the operation surface of the retainer to input a first direction signal indicative of the inclination direction varied in response to the first operation direction to the camera unit; a plurality of keys each operatively arranged on the retainer to perform a key-pushed action and a key-released action, each of the keys being operative to input a key signal indicative of the key-pushed action, the keys including one specified key selected for the second operation direction to the camera unit desired by the operator; and output signal generating means for generating a second direction signal indicative of the second operation direction to the camera unit based on the first direction signal from the joystick and the key signal from the specified key, the output signal generating means being operative to output the second direction signal to the camera unit to ensure the second operation direction to the camera unit desired by the operator.

The second direction signal generated by the output signal generating means may indicate an operation direction to the camera unit which is opposite to an operation direction to the camera unit decided by the first direction signal inputted from the joystick with respect to the center point of the joystick.

The keys may include a plurality of numerical keys which are selectively operated to input the key signals.

In accordance with a third aspect of the present invention, there is provided a camera operating apparatus for operating at least one camera unit at first and second operation speeds and at first and second operation directions which are to be changed by an operator, comprising: a retainer having an operation surface; a joystick mounted on the retainer and having a center axis and a center point located on the center axis, the joystick being pivotable around the center point of the joystick at a variable inclination angle between the center axis of the joystick and the operation surface of the retainer to input a first speed signal indicative of the inclination angle varied in response to the first operation speed to the camera unit and at a variable inclination direction with respect to the operation surface of the retainer to input a first direction signal indicative of the inclination direction varied in response to the first operation direction to the camera unit, the joystick having a first terminal having the first speed signal outputted therethrough and a second terminal having the first direction signal outputted therethrough; a plurality of keys each operatively arranged on the retainer to perform a key-pushed action and a key-released action, each of the keys being operative to input a key signal indicative of the key-pushed action, the keys including one specified key selected for the second operation speed and the second operation direction to the camera unit desired by the operator, the keys having first and second terminals having the key signal outputted therethrough; and output signal generating means for generating and outputting a second speed signal indicative of the second operation speed to the camera unit and a second direction signal indicative of the second operation direction to the camera unit, the output signal generating means including a second speed signal generating unit for generating the second speed signal based on the first speed signal from the joystick and the key signal from the specified key and a second direction signal generating unit for generating the second direction signal based on the first direction signal from the joystick and the key signal from the specified key, the second speed signal generating unit being operative to output the second speed signal to the camera unit to ensure the second operation speed to the camera unit desired by the operator, the second speed signal generating unit having a first terminal having the first speed signal inputted therethrough, a second terminal having the key signal inputted therethrough and a third terminal having the second speed signal outputted therethrough, the second direction signal generating unit being operative to output the second direction signal to the camera unit to ensure the second operation direction to the camera unit desired by the operator, the second direction signal generating unit having a first terminal having the first direction signal inputted therethrough, a second terminal having the key signal inputted therethrough and a third terminal having the second direction signal outputted therethrough.

The second speed signal generated by the second speed signal generating unit of the output signal generating means may indicate an operation speed to the camera unit which is equal to an operation speed to the camera unit decided by the key signal inputted from the specified key.

The second direction signal generated by the second direction signal generating unit of the output signal generating means may indicate an operation direction to the camera unit which is opposite to an operation direction to the camera unit decided by the first direction signal inputted from the joystick with respect to the center point of the joystick.

The keys may include a plurality of numerical keys which are selectively operated to input the key signals.

In accordance with a fourth aspect of the present invention, there is provided a camera operating apparatus for operating at least one camera unit at first and second operation speeds and at first and second operation directions which are to be changed by an operator, comprising: a retainer having an operation surface; a joystick mounted on the retainer and having a center axis and a center point located on the center axis, the joystick being pivotable around the center point of the joystick at a variable inclination angle between the center axis of the joystick and the operation surface of the retainer to input a first speed signal indicative of the inclination angle varied in response to the first operation speed to the camera unit and at a variable inclination direction with respect to the operation surface of the retainer to input a first direction signal indicative of the inclination direction varied in response to the first operation direction to the camera unit, the first speed signal consisting of first and second components, the first direction signal consisting of first and second components, the joystick having a first terminal having the first component of the first speed signal and first component of the first direction signal outputted therethrough and a second terminal having the second component of the first speed signal and the second component of the first direction signal outputted therethrough; a plurality of keys each operatively arranged on the retainer to perform a key-pushed action and a key-released action, each of the keys being operative to input a key signal indicative of the key-pushed action, the keys including one specified key selected for the second operation speed and the second operation direction to the camera unit desired by the operator, the keys having first, second and third terminals having the key signal outputted therethrough; and output signal generating means for generating and outputting a second speed signal indicative of the second operation speed to the camera unit and a second direction signal indicative of the second operation direction to the camera unit, the output signal generating means including a second speed signal generating unit for generating the second speed signal based on the first and second components of the first speed signal from the joystick and the key signal from the specified key and a second direction signal generating unit for generating the second direction signal based on the first and second components of the first direction signal from the joystick and the key signal from the specified key, the second speed signal generating unit being operative to output the second speed signal to the camera unit to ensure the second operation speed to the camera unit desired by the operator, the second speed signal generating unit having a key signal processing unit for processing the key signal from the specified key to output the second speed signal, a speed signal processing unit for processing and synthesizing the first and second components of the first speed signal from the joystick to output the first speed signal, a first buffer circuit being operative to assume two operation states consisting of a first operation state to allow the second speed signal to pass therethrough and a second operation state not to allow the second speed signal to pass therethrough, a second buffer circuit being operative to assume two operation states consisting of a first operation state to allow the first speed signal to pass therethrough and a second operation state not to allow the first speed signal to pass therethrough and an OR circuit being operative to assume two operation states consisting of a first operation state to allow the second speed signal to pass therethrough and a second operation state to allow the first speed signal to pass therethrough to be outputted as a second speed signal, the key signal processing unit having first and second terminals having the key signal inputted therethrough and a third terminal having the second speed signal outputted therethrough, the speed signal processing unit having a first terminal having the first component of the first speed signal inputted therethrough, a second terminal having the second component of the first speed signal inputted therethrough and a third terminal having the first speed signal outputted therethrough, the first buffer circuit having first, second and third terminals, the first and second terminals of the first buffer circuit being operative to allow the second speed signal from the key signal processing unit to pass therethrough when the third terminal of the first buffer circuit is operative to receive the key signal from the specified key and operative not to allow the second speed signal from the key signal processing unit to pass therethrough when the third terminal of the first buffer circuit is operative not to receive the key signal from the specified key, the second buffer circuit having first, second and third terminals, the first and second terminals of the second buffer circuit being operative to allow the first speed signal from the speed signal processing unit to pass therethrough when the third terminal of the second buffer circuit is operative not to receive the key signal from the specified key and operative not to allow the first speed signal from the speed signal processing unit to pass therethrough when the third terminal of the first buffer circuit is operative to receive the key signal from the specified key, the OR circuit having first, second and third terminals, the first and third terminals of the OR circuit being operative to allow the second speed signal from the first buffer circuit to pass therethrough when the first terminal of the OR circuit is operative to receive the second speed signal from the first buffer circuit, the second and third terminals of the OR circuit being operative to allow the first speed signal from the second buffer circuit to pass therethrough to be outputted as a second speed signal when the second terminal of the OR circuit is operative to receive the first speed signal from the second buffer circuit, the second direction signal generating unit being operative to output the second direction signal to the camera unit to ensure the second operation direction to the camera unit desired by the operator, the second direction signal generating unit having a direction signal processing unit for processing and synthesizing the first and second components of the first direction signal from the joystick to output the first and second direction signals, a first buffer circuit being operative to assume two operation states consisting of a first operation state to allow the first direction signal to pass therethrough and a second operation state not to allow the first direction signal to pass therethrough, a second buffer circuit being operative to assume two operation states consisting of a first operation state to allow the second direction signal to pass therethrough and a second operation state not to allow the second direction signal to pass therethrough and an OR circuit being operative to assume two operation states consisting of a first operation state to allow the first direction signal to pass therethrough to be outputted as a second direction signal and a second operation state to allow the second direction signal to pass therethrough, the direction signal processing unit having a first terminal having the first component of the first direction signal inputted therethrough, a second terminal having the second component of the first direction signal inputted therethrough, a third terminal having the first direction signal outputted therethrough and a fourth terminal having the second direction signal outputted therethrough, the first buffer circuit having first, second and third terminals, the first and second terminals of the first buffer circuit being operative to allow the first direction signal from the direction signal processing unit to pass therethrough when the third terminal of the first buffer circuit is operative not to receive the key signal from the specified key and operative not to allow the first direction signal from the direction signal processing unit to pass therethrough when the third terminal of the first buffer circuit is operative to receive the key signal from the specified key, the second buffer circuit having first, second and third terminals, the first and second terminals of the second buffer circuit being operative to allow the second direction signal from the direction signal processing unit to pass therethrough when the third terminal of the second buffer circuit is operative to receive the key signal from the specified key and operative not to allow the second direction signal from the direction signal processing unit to pass therethrough when the third terminal of the first buffer circuit is operative not to receive the key signal from the specified key, the OR circuit having first, second and third terminals, the first and third terminals of the OR circuit being operative to allow the first direction signal from the first buffer circuit to pass therethrough to be outputted as a second direction signal when the first terminal of the OR circuit is operative to receive the first direction signal from the first buffer circuit, the second and third terminals of the OR circuit being operative to allow the second direction signal from the second buffer circuit to pass therethrough when the second terminal of the OR circuit is operative to receive the second direction signal from the second buffer circuit.

The second speed signal generated by the key signal processing unit of the second speed signal generating unit may indicate an operation speed to the camera unit which is equal to an operation speed to the camera unit decided by the key signal inputted from the specified key.

The second direction signal generated by the direction signal processing unit of the second direction signal generating unit may indicate an operation direction to the camera unit which is opposite to an operation direction to the camera unit decided by the first direction signal inputted from the joystick with respect to the center point of the joystick.

The keys may include a plurality of numerical keys which are selectively operated to input the key signals.

BRIEF DESCRIPTION OF THE DRAWINGS

The objects, features and advantages of the present invention will become apparent as the description proceeds when taken in conjunction with the accompanying drawings, in which:

FIG. 4 is a table showing corresponding relations between an inclination angle of a joystick forming part of the camera operating apparatus shown in FIG. 2 and an operation speed of a camera unit;

FIG. 9 is a block diagram showing the camera operating apparatus according to the present invention and a camera unit operatively connected with the camera operating apparatus;

FIG. 10 is a block diagram of one example of a conventional surveillance system; and FIG. 11 is a block diagram of another example of the conventional surveillance system.

DESCRIPTION OF THE PREFERRED EMBODIMENTS

Figure 1:
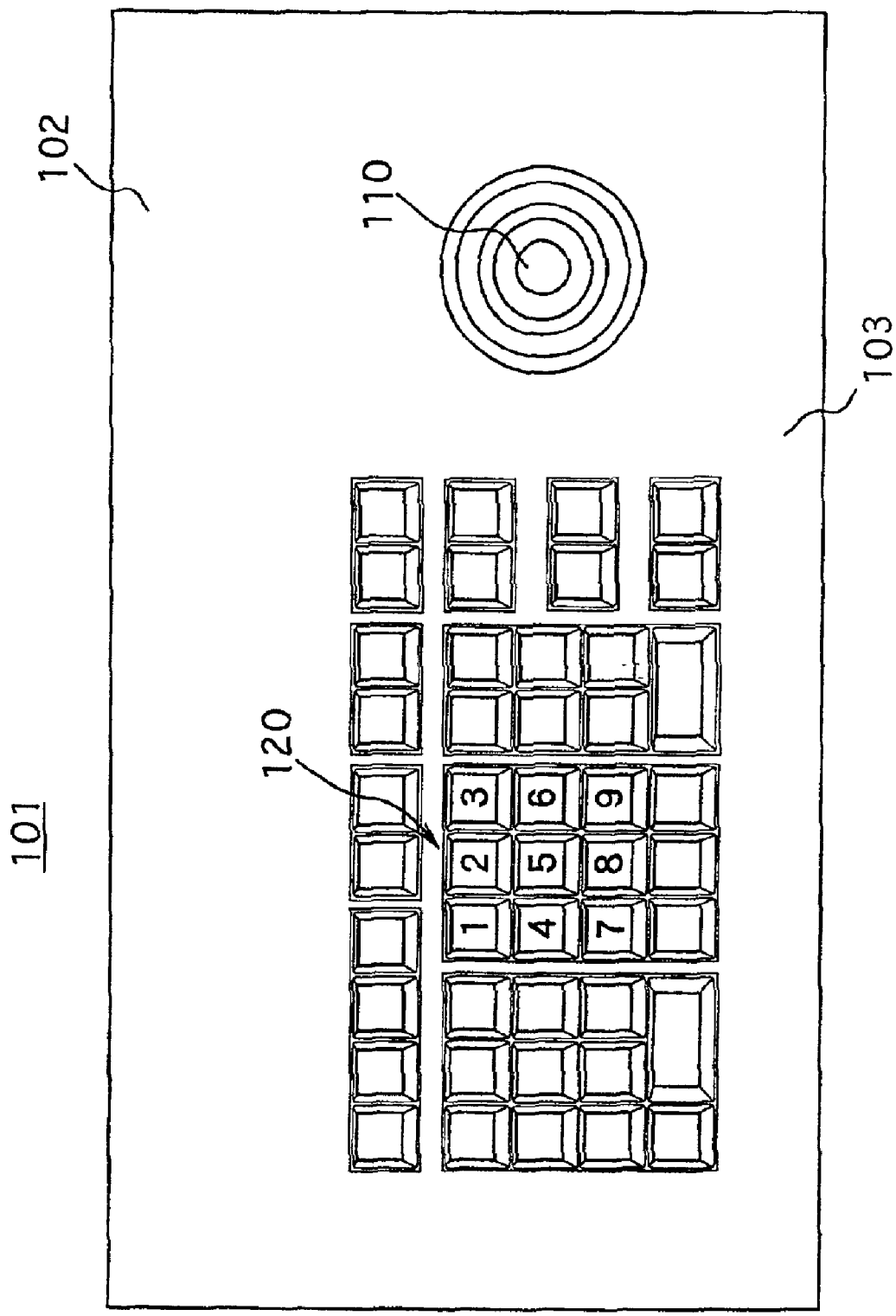
FIG. 1 is a plan view of the first embodiment of the camera operating apparatus according to the present invention.

The first preferred embodiment of the camera operating apparatus according to the present invention will now be described in detail in accordance with the accompanying drawings.

Referring now to the drawings, in particular to FIGS. 1 to 6, there is shown the first preferred embodiment of the camera operating apparatus according to the present invention. The camera operating apparatus 101 is assumed to operate at least one camera unit 300 at first and second operation speeds and at first and second operation directions which are to be changed by an operator. The camera operating apparatus 101 comprises a retainer 102 having an operation surface 103, a joystick 110 mounted on the retainer 102 and having a center axis 111 and a center point 112 located on the center axis 111.

The joystick 110 is pivotable around the center point 112 of the joystick 110 at a variable inclination angle between the center axis 111 of the joystick 110 and the operation surface 103 of the retainer 102 to input a first speed signal indicative of the inclination angle varied in response to the first operation speed to the camera unit 300.

Figure 2:
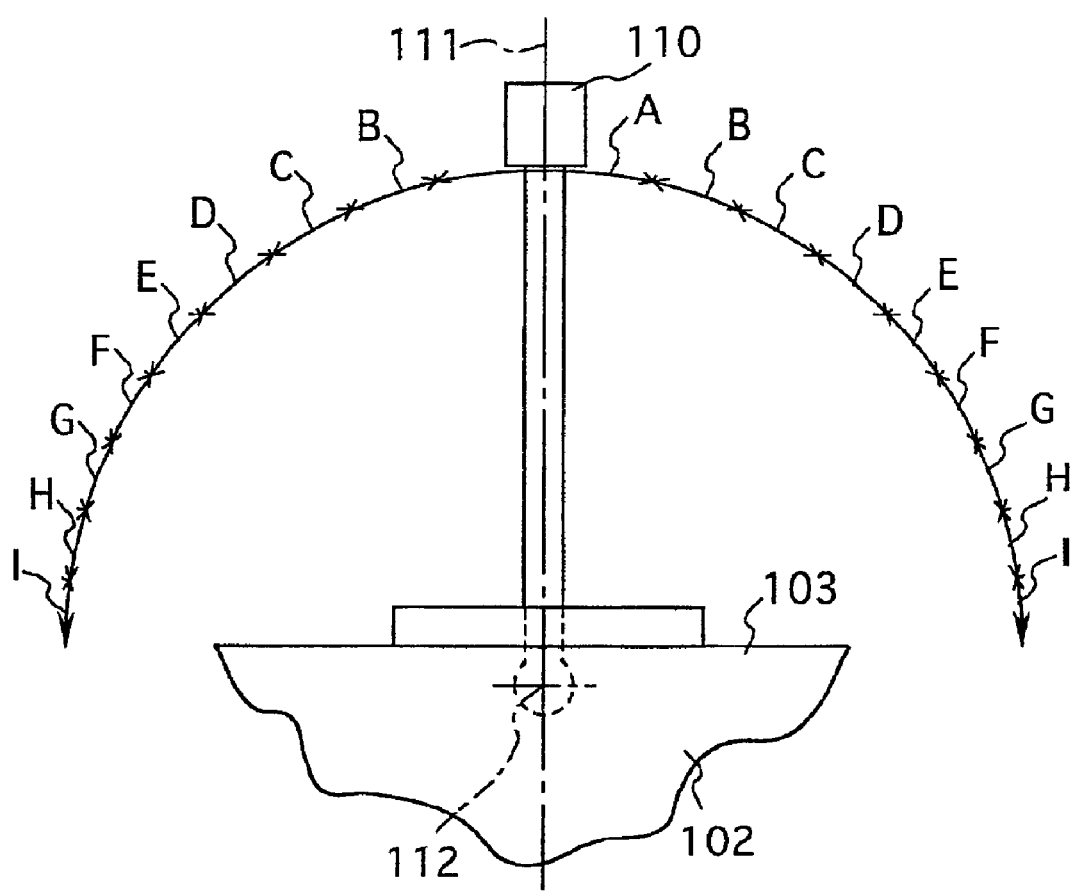
FIG. 2 is a fragmentary side view of a retainer and a joystick forming part of the camera operating apparatus shown in FIG. 1.
Figure 3:
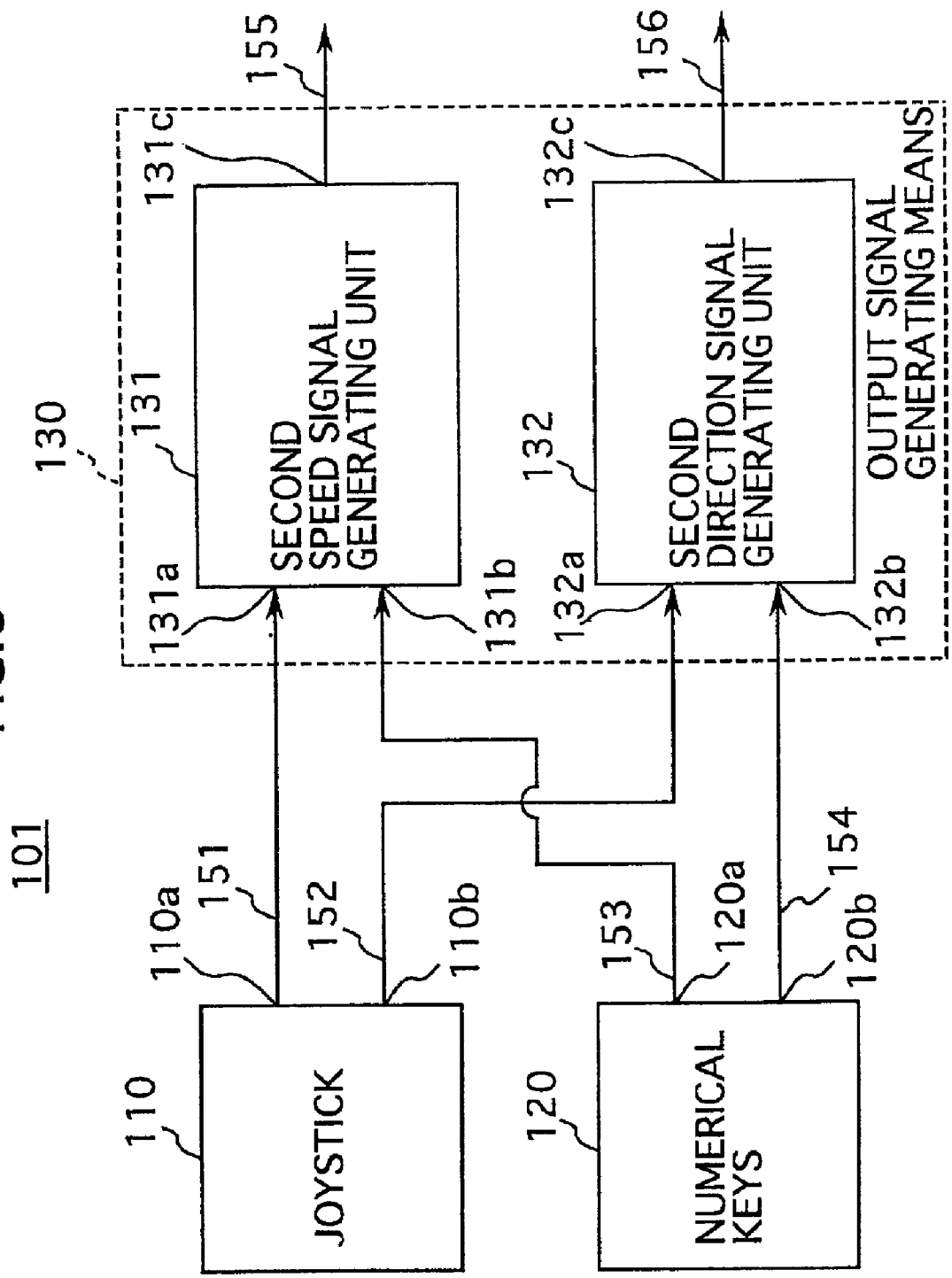
FIG. 3 is a block diagram showing a joystick, numerical keys and an output signal generating means forming part of the camera operating apparatus according to the present invention.

The inclination angle of the joystick 110 is divided in angle ranges "A" to "I" as shown in FIG. 2. The joystick 110 is inclined with respect to the operation surface 103 of the retainer 102 to input the first speed signal indicative of each of the angle ranges "A" to "I" corresponding to operation speeds "0" to "8" as listed in FIG. 4. Here, the operation speed "0" means the stop state of the camera unit 300, and the operation speed "1" means the lowest operation speed of the camera unit 300, and the operation speed "8" means the highest operation speed of the camera unit 300. The above fact leads to the fact that the operation speeds increase as the numerals "1" to "8" increase.

The joystick 110 is pivotable around the center point 112 of the joystick 110 at a variable inclination direction with respect to the operation surface 103 of the retainer 102 to input a first direction signal indicative of the inclination direction varied in response to the first operation direction to the camera unit 300. The joystick 110 has a first terminal 110a having the first speed signal outputted therethrough and a second terminal 110b having the first direction signal outputted therethrough.

The camera operating apparatus 101 further comprises a plurality of keys 120 each operatively arranged on the retainer 102 to perform a key-pushed action and a key-released action. Each of the keys 120 is operative to input a key signal indicative of the key-pushed action. The keys 120 include one specified key selected for the second operation speed and the second operation direction to the camera unit 300 desired by the operator. The keys 120 have first and second terminals 120a and 120b having the key signal outputted therethrough. The keys 120 may include a plurality of numerical keys 120 which are selectively operated to input the key signals. The numerical keys 120 bear the numeral "1" to "9" as shown in FIG. 1.

The camera operating apparatus 101 further comprises output signal generating means 130 which is designed to generate and to output a second speed signal indicative of the second operation speed to the camera unit 300 and a second direction signal indicative of the second operation direction to the camera unit 300. The output signal generating means 130 includes a second speed signal generating unit 131 and a second direction signal generating unit 132.

The second speed signal generating unit 131 is designed to generate the second speed signal based on the first speed signal from the joystick 110 and the key signal from the specified key. The second speed signal generating unit 131 is operative to output the second speed signal to the camera unit 300 to ensure the second operation speed to the camera unit 300 desired by the operator. The second speed signal generated by the second speed signal generating unit 131 indicates an operation speed to the camera unit 300 which is equal to an operation speed to the camera unit 300 decided by the key signal inputted from the specified key.

The second speed signal generating unit 131 has a first terminal 131a having the first speed signal inputted therethrough, a second terminal 131b having the key signal inputted therethrough and a third terminal 131c having the second speed signal outputted therethrough.

The second direction signal generating unit 132 is designed to generate the second direction signal based on the first direction signal from the joystick 110 and the key signal from the specified key. The second direction signal generating unit 132 is operative to output the second direction signal to the camera unit 300 to ensure the second operation direction to the camera unit 300 desired by the operator. The second direction signal generated by the second direction signal generating unit 132 indicates an operation direction to the camera unit 300 which is opposite to an operation direction to the camera unit 300 decided by the first direction signal inputted from the joystick 110 with respect to the center point 112 of the joystick 110.

The second direction signal generating unit 132 has a first terminal 132a having the first direction signal inputted therethrough, a second terminal 132b having the key signal inputted therethrough and a third terminal 132c having the second direction signal outputted therethrough.

The joystick 110 is electrically connected at the first terminal 110a and at the first terminal 131a to the second speed signal generating unit 131 through a signal transmitting line 151. The joystick 110 is electrically connected at the second terminal 110b and at the first terminal 132a to the second direction signal generating unit 132 through a signal transmitting line 152.

Each of the numerical keys 120 is electrically connected at the first terminal 120a and at the second terminal 131b to the second speed signal generating unit 131 through a signal transmitting line 153. Each of the numerical keys 120 is electrically connected at the second terminal 120b and at the second terminal 132b to the second direction signal generating unit 132 through a signal transmitting line 154.

The second speed signal generating unit 131 is electrically connected at the third terminal 131c to the camera unit 300 through a signal transmitting line 155. The second direction signal generating unit 132 is electrically connected at the third terminal 132c to the camera unit 300 through a signal transmitting line 156.

Figure 5:
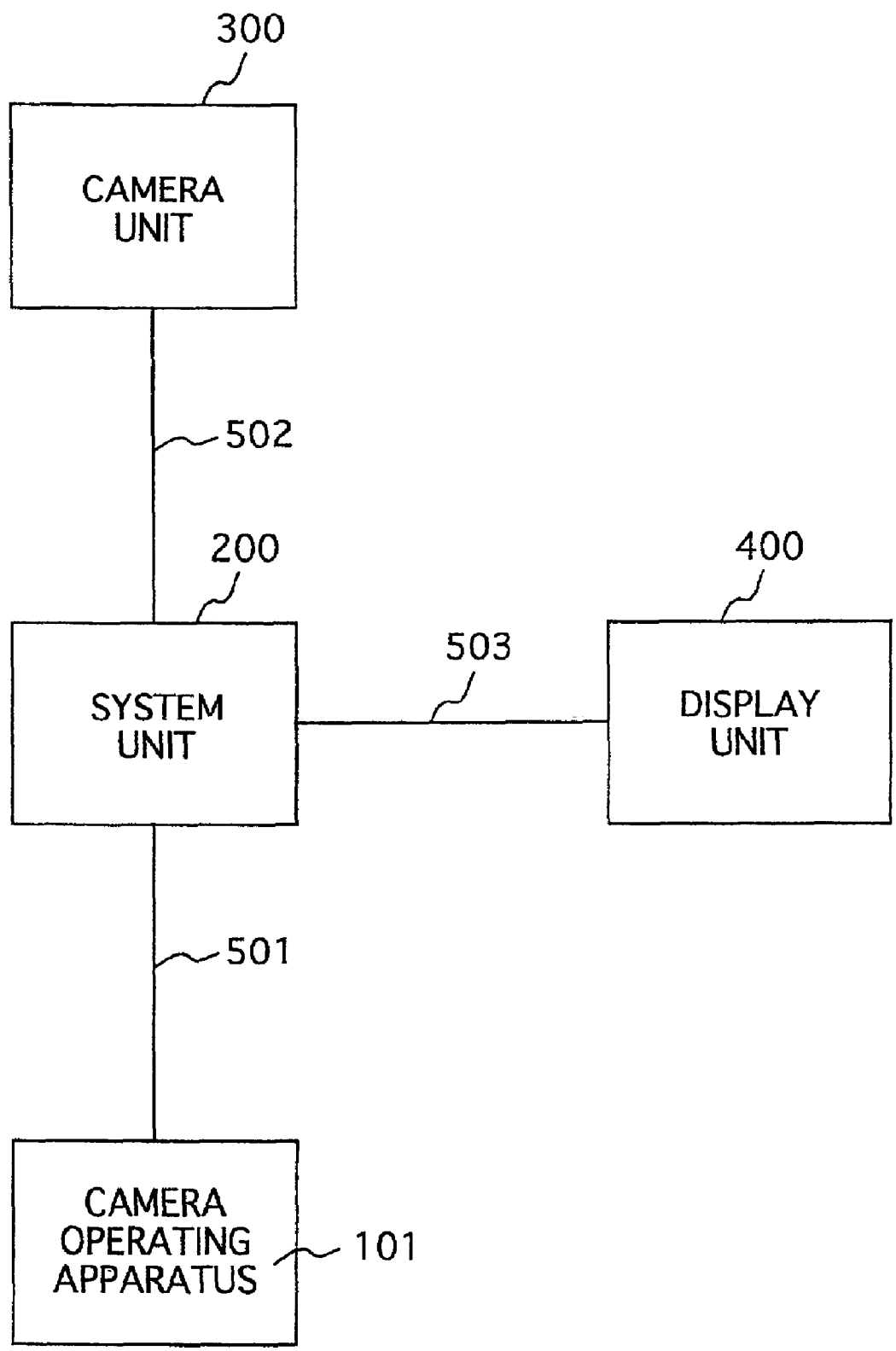
FIG. 5 is a block diagram showing the camera operating apparatus shown in FIG. 1 and a camera unit operatively connected with the camera operating apparatus.

As shown in FIG. 5, the camera operating apparatuses 101 is provided in combination with a surveillance system which comprises a system unit 200, a camera unit 300, a display unit 400 and the camera operating apparatus 101 for operating the camera unit 300 at the operation speed and at the operation direction which are to be changed by the operator. The system unit 200 is electrically connected to the camera operating apparatus 101, the camera unit 300 and the display unit 400 through signal transmitting lines 501, 502 and 503, respectively.

The operation of the camera operating apparatus 101 will be described hereinafter with reference to the drawings shown in FIGS. 1 to 6.

The following description will be directed to the case that the joystick 110 is inclined with respect to the operation surface 103 of the retainer 102 while no numerical key 120 is being pushed by the operator.

When the joystick 110 is inclined with respect to the operation surface 103 of the retainer 102 while no numerical key 120 is being pushed by the operator, the joystick 110 is operative to output the first speed signal indicative of the operation speed to the camera unit 300 in response to the inclination angle of the joystick 110 to the signal transmitting line 151.

Further, the inclination of the joystick 110 with respect to the operation surface 103 of the retainer 102 causes the joystick 110 to output the first direction signal indicative of the operation direction to the camera unit 300 in response to the inclination direction of the joystick 110 to the signal transmitting line 152.

The first speed signal outputted to the signal transmitting line 151 is inputted into the second speed signal generating unit 131 through the signal transmitting line 151.

When no key signal indicative of the key-pushed action of any one of the numeral keys 120 outputted to the signal transmitting line 153 is inputted into the second speed signal generating unit 131 through the signal transmitting line 153, no key signal indicative of the key-pushed action of any one of the numeral keys 120 thus inputted into the second speed signal generating unit 131 causes the second speed signal generating unit 131 to be operated to generate the second speed signal indicative of the operation speed which is equal to the operation speed decided by the first speed signal inputted from the joystick 110 to be outputted to the signal transmitting line 155.

The first direction signal outputted to the signal transmitting line 152 is inputted into the second direction signal generating unit 132 through the signal transmitting line 152.

When no key signal indicative of the key-pushed action of any one of the numeral keys 120 outputted to the signal transmitting line 154 is inputted into the second direction signal generating unit 132 through the signal transmitting line 154, no key signal indicative of the key-pushed action of any one of the numeral keys 120 thus inputted into the second direction signal generating unit 132 causes the second direction signal generating unit 132 to be operated to generate the second direction signal indicative of the operation direction which is equal to the operation direction decided by the first direction signal inputted from the joystick 110 to be outputted to the signal transmitting line 156.

The second speed signal thus outputted to the signal transmitting line 155 and the second direction signal thus outputted to the signal transmitting line 156 are inputted into the camera unit 300 by way of the signal transmitting line 501, the system unit 200 and the signal transmitting line 502 as shown in FIG. 5.

Form the foregoing description, it will be understood that the joystick 110 inclined with respect to the operation surface 103 of the retainer 102 while no numerical key 120 is being pushed by the operator causes the camera unit 300 to be operated at the operation speed corresponding to the inclination angle of the joystick 110 and at the operation direction corresponding to the inclination direction of the joystick 110.

The following description will be directed to the case that the joystick 110 is inclined with respect to the operation surface 103 of the retainer 102 while one of the numerical keys 120 selected as one specified key for the second operation speed and the second operation direction is being pushed by the operator.

The following description is an example having one of the numerical keys 120 bearing the numerals "1" to "8" pushed by the operator as one specified key selected for the second operation speed and the second operation direction to said camera unit 300.

When the joystick 110 is inclined with respect to the operation surface 103 of the retainer 102 while one of the numerical keys 120 bearing the numerals "1" to "8" is being pushed by the operator, the joystick 110 is operative to output the first speed signal indicative of the operation speed to the camera unit 300 in response to the inclination angle of the joystick 110 to the signal transmitting line 151.

Further, the inclination of the joystick 110 with respect to the operation surface 103 of the retainer 102 causes the joystick 110 to output the first direction signal indicative of the operation direction to the camera unit 300 in response to the inclination direction of the joystick 110 to the signal transmitting line 152.

When one of the numerical keys 120 bearing the numerals "1" to "8" is pushed by the operator as one specified key selected for the second operation speed and the second operation direction to said camera unit 300, the specified key thus pushed causes the key signal indicative of the key-pushed action of the specified key to be outputted to the signal transmitting lines 153 and 154.

The first speed signal outputted to the signal transmitting line 151 is inputted into the second speed signal generating unit 131 through the signal transmitting line 151, while the key signal outputted to the signal transmitting line 153 is inputted into the second speed signal generating unit 131 through the signal transmitting line 153.

When the key signal indicative of the key-pushed action of any one of the numeral keys 120 bearing the numerals "1" to "8" outputted to the signal transmitting line 153 is inputted into the second speed signal generating unit 131 through the signal transmitting line 153, the key signal indicative of the key-pushed action of any one of the numeral keys 120 bearing the numerals "1" to "8" thus inputted into the second speed signal generating unit 131 causes the second speed signal generating unit 131 to be operated to generate the second speed signal indicative of the operation speed corresponding to the numeral represented on the specified key as listed in FIG. 4 to be outputted to the signal transmitting line 155.

The first direction signal outputted to the signal transmitting line 152 is inputted into the second direction signal generating unit 132 through the signal transmitting line 152, while the key signal outputted to the signal transmitting line 154 is inputted into the second direction signal generating unit 132 through the signal transmitting line 154.

When the key signal indicative of the key-pushed action of any one of the numeral keys 120 bearing the numerals "1" to "8" outputted to the signal transmitting line 154 is inputted into the second direction signal generating unit 132 through the signal transmitting line 154, the key signal indicative of the key-pushed action of any one of the numeral keys 120 bearing the numerals "1" to "8" thus inputted into the second direction signal generating unit 132 causes the second direction signal generating unit 132 to be operated to generate the second direction signal indicative of the operation direction which is equal to the operation direction decided by the first direction signal inputted from the joystick 110 to be outputted to the signal transmitting line 156.

The second speed signal thus outputted to the signal transmitting line 155 and the second direction signal thus outputted to the signal transmitting line 156 are inputted into the camera unit 300 by way of the signal transmitting line 501, the system unit 200 and the signal transmitting line 502 as shown in FIG. 5.

Form the foregoing description, it will be understood that the joystick 110 inclined with respect to the operation surface 103 of the retainer 102 while one of the numerical keys 120 bearing the numerals "1" to "8" is being pushed by the operator causes the camera unit 300 to be operated at the operation speed corresponding to the numeral represented on the specified key and at the operation direction corresponding to the inclination direction of the joystick 110.

The following description is an example having the numerical key 120 bearing the numeral "9" pushed by the operator as one specified key selected for the second operation speed and the second operation direction to said camera unit 300.

When the joystick 110 is inclined with respect to the operation surface 103 of the retainer 102 while the numerical key 120 bearing the numeral "9" is being pushed by the operator, the joystick 110 is operative to output the first speed signal indicative of the operation speed to the camera unit 300 in response to the inclination angle of the joystick 110 to the signal transmitting lines 151.

Further, the inclination of the joystick 110 with respect to the operation surface 103 of the retainer 102 causes the joystick 110 to output the first direction signal indicative of the operation direction to the camera unit 300 in response to the inclination direction of the joystick 110 to the signal transmitting line 152.

When the numerical key 120 bearing the numeral "9" is pushed by the operator as one specified key selected for the second operation speed and the second operation direction to said camera unit 300, the specified key thus pushed causes the key signal indicative of the key-pushed action of the specified key to be outputted to the signal transmitting line 153 and 154.

The first speed signal outputted to the signal transmitting line 151 is inputted into the second speed signal generating unit 131 through the signal transmitting line 151, while the key signal outputted to the signal transmitting line 153 is inputted into the second speed signal generating unit 131 through the signal transmitting line 153.

When the key signal indicative of the key-pushed action of the numeral key 120 bearing the numeral "9" outputted to the signal transmitting line 153 is inputted into the second speed signal generating unit 131 through the signal transmitting line 153, the key signal indicative of the key-pushed action of the numeral key 120 bearing the numeral "9" thus inputted into the second speed signal generating unit 131 causes the second speed signal generating unit 131 to be operated to generate the second speed signal indicative of the operation speed corresponding to the numeral "1" as listed in FIG. 4 to be outputted to the signal transmitting line 155.

The first direction signal outputted to the signal transmitting line 152 is inputted into the second direction signal generating unit 132 through the signal transmitting line 152, while the key signal outputted to the signal transmitting line 154 is inputted into the second direction signal generating unit 132 through the signal transmitting line 154.

When the key signal indicative of the key-pushed action of the numeral key 120 bearing the numeral "9" outputted to the signal transmitting line 154 is inputted into the second direction signal generating unit 132 through the signal transmitting line 154, the key signal indicative of the key-pushed action of the numeral key 120 bearing the numeral "9" thus inputted into the second direction signal generating unit 132 causes the second direction signal generating unit 132 to be operated to generate the second direction signal indicative of the operation direction which is opposite to the operation direction decided by the first direction signal inputted from the joystick 110 to be outputted to the signal transmitting line 156.

The second speed signal thus outputted to the signal transmitting line 155 and the second direction signal thus outputted to the signal transmitting line 156 are inputted into the camera unit 300 by way of the signal transmitting line 501, the system unit 200 and the signal transmitting line 502 as shown in FIG. 5.

Form the foregoing description, it will be understood that the joystick 110 inclined with respect to the operation surface 103 of the retainer 102 while the numerical key 120 bearing the numeral "9" is being pushed by the operator causes the camera unit 300 to be operated at the operation speed corresponding to the numeral "1" and at the operation direction opposite to the operation direction corresponding to the inclination direction of the joystick 110.

As will be seen from the above description, the present embodiment of the camera operating apparatus according to the preset invention can control the operation speed of the camera unit 300 at a constant level corresponding to the numeral represented on the specified key. This leads to the fact that the camera unit 300 can be operated with a minute action and can enhance the efficiency of the surveillance operation by the camera unit 300 when the camera unit 300 has an operation angle range designated by the operator under the "AUTOPAN" function having the camera unit 300 perform a reciprocation motion in the range of a predetermined angle, or otherwise when the camera unit 300 has a motion path designated by the operator under the "PATROL" function having an operation direction range, a zooming range, a focusing range and the other memorized therein to perform the various motions of the camera unit in line with the memorized functions.

Figure 6:
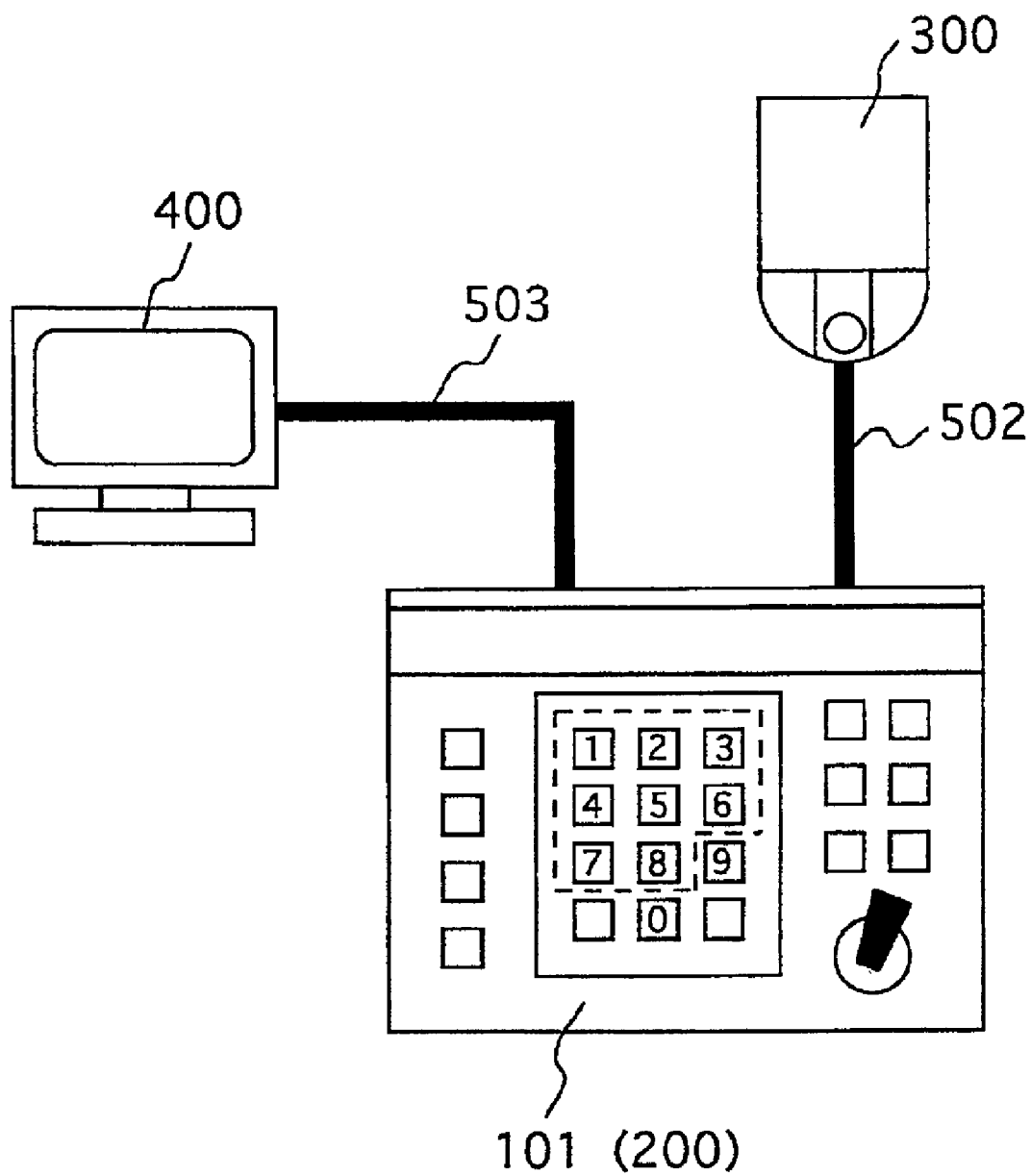
FIG. 6 is a block diagram showing the camera operating apparatus according to the present invention and a camera unit operatively connected with the camera operating apparatus.
Figure 7:
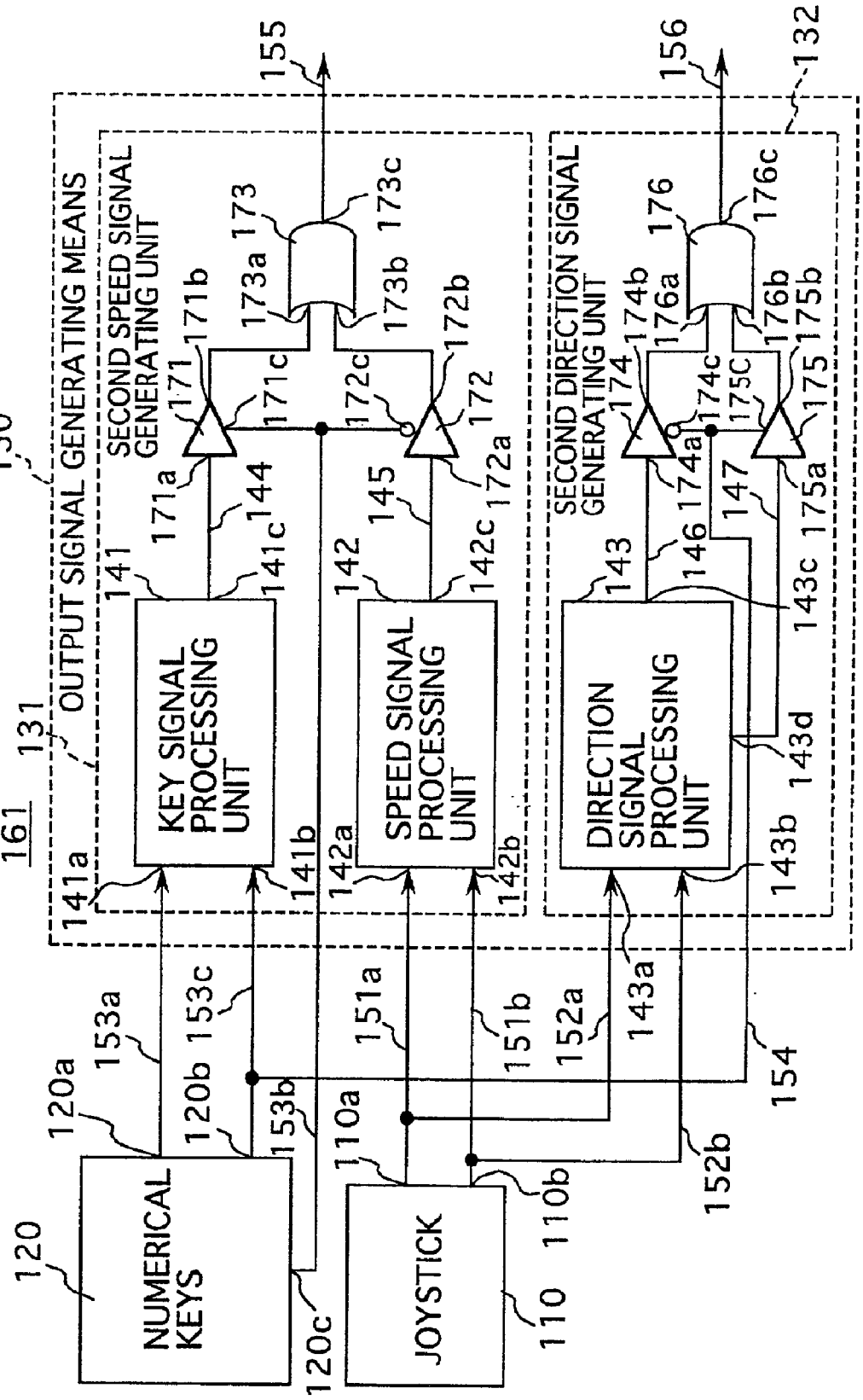
FIG. 7 is a block diagram of the second embodiment of the camera operating apparatus according to the present invention.

Though the camera operating apparatus 101 is shown in FIG. 5 as being separated from the system unit 200, the camera operating apparatus 101 exemplified by the present invention may have the system unit 200 assembled therein to control the operation speeds and the operation directions to the camera unit. This means that the system unit 200 is assembled in the camera operating apparatus 101 as shown in FIG. 6.

The second preferred embodiment of the camera operating apparatus according to the present invention will now be described in detail in accordance with the accompanying drawings.

Referring now to the drawings, in particular to FIGS. 1, 2, 4, 7 to 9, there is shown the second preferred embodiment of the camera operating apparatus according to the present invention. The camera operating apparatus 161 is assumed to operate at least one camera unit 300 at first and second operation speeds and at first and second operation directions which are to be changed by an operator. The camera operating apparatus 161 comprises a retainer 102 having an operation surface 103, a joystick 110 mounted on the retainer 102 and having a center axis 111 and a center point 112 located on the center axis 111.

The joystick 110 is pivotable around the center point 112 of the joystick 110 at a variable inclination angle between the center axis 111 of the joystick 110 and the operation surface 103 of the retainer 102 to input a first speed signal indicative of the inclination angle varied in response to the first operation speed to the camera unit 300.

The inclination angle of the joystick 110 is divided in angle ranges "A" to "I" as shown in FIG. 2. The joystick 110 is inclined with respect to the operation surface 103 of the retainer 102 to input the first speed signal indicative of each of the angle ranges "A" to "I" corresponding to operation speeds "0" to "8" as listed in FIG. 4. Here, the operation speed "0" means the stop state of the camera unit 300, and the operation speed "1" means the lowest operation speed of the camera unit 300, and the operation speed "8" means the highest operation speed of the camera unit 300. The above fact leads to the fact that the operation speeds increase as the numerals "1" to "8" increase.

The joystick 110 is pivotable around the center point 112 of the joystick 110 at a variable inclination direction with respect to the operation surface 103 of the retainer 102 to input a first direction signal indicative of the inclination direction varied in response to the first operation direction to the camera unit 300.

The first speed signal consists of first and second components. The first direction signal consists of first and second components. The joystick 110 has a first terminal 110a having the first component of the first speed signal and first component of the first direction signal outputted therethrough and a second terminal 110b having the second component of the first speed signal and the second component of the first direction signal outputted therethrough.

The camera operating apparatus 161 further comprises a plurality of keys 120 each operatively arranged on the retainer 102 to perform a key-pushed action and a key-released action. Each of the keys 120 is operative to input a key signal indicative of the key-pushed action. The keys 120 include one specified key selected for the second operation speed and the second operation direction to the camera unit 300 desired by the operator. The keys 120 have first, second and third terminals 120a, 120b and 120c having the key signal outputted therethrough. The keys 120 may include a plurality of numerical keys 120 which are selectively operated to input the key signals. The numerical keys 120 bear the numeral "1" to "9" as shown in FIG. 1.

The camera operating apparatus 161 further comprises output signal generating means 130 which is designed to generate and to output a second speed signal indicative of the second operation speed to the camera unit 300 and a second direction signal indicative of the second operation direction to the camera unit 300. The output signal generating means 130 includes a second speed signal generating unit 131 and a second direction signal generating unit 132.

The second speed signal generating unit 131 is designed to generate the second speed signal based on the first and second components of the first speed signal from the joystick 110 and the key signal from the specified key. The second speed signal generating unit 131 is operative to output the second speed signal to the camera unit 300 to ensure the second operation speed to the camera unit 300 desired by the operator. The second speed signal generated by second speed signal generating unit 131 indicates an operation speed to the camera unit 300 which is equal to an operation speed to the camera unit 300 decided by the key signal inputted from the specified key.

The second speed signal generating unit 131 has a key signal processing unit 141, a speed signal processing unit 142, a first buffer circuit 171, a second buffer circuit 172 and an OR circuit 173.

The key signal processing unit 141 is designed to process the key signal from the specified key to output the second speed signal. The key signal processing unit 141 has first and second terminals 141a and 141b having the key signal inputted therethrough and a third terminal 141c having the second speed signal outputted therethrough.

The speed signal processing unit 142 is designed to process and to synthesize the first and second components of the first speed signal from the joystick 110 to output the first speed signal. The speed signal processing unit 142 has a first terminal 142a having the first component of the first speed signal inputted therethrough, a second terminal 142b having the second component of the first speed signal inputted therethrough and a third terminal 142c having the first speed signal outputted therethrough.

The first buffer circuit 171 is operative to assume two operation states consisting of a first operation state to allow the second speed signal to pass therethrough and a second operation state not to allow the second speed signal to pass therethrough. The first buffer circuit 171 has first, second and third terminals 171a, 171b and 171c. The first and second terminals 171a and 171b of the first buffer circuit 171 are operative to allow the second speed signal from the key signal processing unit 141 to pass therethrough when the third terminal 171c of the first buffer circuit 171 is operative to receive the key signal from the specified key and operative not to allow the second speed signal from the key signal processing unit 141 to pass therethrough when the third terminal 171c of the first buffer circuit 171 is operative not to receive the key signal from the specified key.

The second buffer circuit 172 is operative to assume two operation states consisting of a first operation state to allow the first speed signal to pass therethrough and a second operation state not to allow the first speed signal to pass therethrough. The second buffer circuit 172 has first, second and third terminals 172a, 172b and 172c. The first and second terminals 172a and 172b of the second buffer circuit 172 are operative to allow the first speed signal from the speed signal processing unit 142 to pass therethrough when the third terminal 172c of the second buffer circuit 172 is operative not to receive the key signal from the specified key and operative not to allow the first speed signal from the speed signal processing unit 142 to pass therethrough when the third terminal 172c of the second buffer circuit 172 is operative to receive the key signal from the specified key.

The OR circuit 173 is operative to assume two operation states consisting of a first operation state to allow the second speed signal to pass therethrough and a second operation state to allow the first speed signal to pass therethrough to be outputted as a second speed signal. The OR circuit 173 has first, second and third terminals 173a, 173b and 173c. The first and third terminals 173a and 173c of the OR circuit 173 are operative to allow the second speed signal from the first buffer circuit 171 to pass therethrough when the first terminal 173a of the OR circuit 173 is operative to receive the second speed signal from the first buffer circuit 171. The second and third terminals 173b and 173c of the OR circuit 173 are operative to allow the first speed signal from the second buffer circuit 172 to pass therethrough to be outputted as a second speed signal when the second terminal 173b of the OR circuit 173 is operative to receive the first speed signal from the second buffer circuit 172.

The second direction signal generating unit 132 is designed to generate the second direction signal based on the first and second components of the first direction signal from the joystick 110 and the key signal from the specified key.

The second direction signal generating unit 132 is operative to output the second direction signal to the camera unit 300 to ensure the second operation direction to the camera unit 300 desired by the operator. The second direction signal generated by the second direction signal generating unit 132 indicates an operation direction to the camera unit 300 which is opposite to an operation direction to the camera unit 300 decided by the first direction signal inputted from the joystick 110 with respect to the center point 112 of the joystick 110.

The second direction signal generating unit 132 has a direction signal processing unit 143, a first buffer circuit 174, a second buffer circuit 175 and an OR circuit 176.

The direction signal processing unit 143 is designed to process and to synthesize the first and second components of the first direction signal from the joystick 110 to output the first and second direction signals. The direction signal processing unit 143 has a first terminal 143a having the first component of the first direction signal inputted therethrough, a second terminal 143b having the second component of the first direction signal inputted therethrough, a third terminal 143c having the first direction signal outputted therethrough and a fourth terminal 143d having the second direction signal outputted therethrough.

The first buffer circuit 174 is operative to assume two operation states consisting of a first operation state to allow the first direction signal to pass therethrough and a second operation state not to allow the first direction signal to pass therethrough. The first buffer circuit 174 has first, second and third terminals 174a, 174b and 174c. The first and second terminals 174a and 174b of the first buffer circuit 174 are operative to allow the first direction signal from the direction signal processing unit 143 to pass therethrough when the third terminal 174c of the first buffer circuit 174 is operative not to receive the key signal from the specified key and operative not to allow the first direction signal from the direction signal processing unit 143 to pass therethrough when the third terminal 174c of the first buffer circuit 174 is operative to receive the key signal from the specified key.

The second buffer circuit 175 is operative to assume two operation states consisting of a first operation state to allow the second direction signal to pass therethrough and a second operation state not to allow the second direction signal to pass therethrough. The second buffer circuit 175 has first, second and third terminals 175a, 175b and 175c. The first and second terminals 175a and 175b of the second buffer circuit 175 are operative to allow the second direction signal from the direction signal processing unit 143 to pass therethrough when the third terminal 175c of the second buffer circuit 175 is operative to receive the key signal from the specified key and operative not to allow the second direction signal from the direction signal processing unit 143 to pass therethrough when the third terminal 175a of the second buffer circuit 175 is operative not to receive the key signal from the specified key.

The OR circuit 176 is operative to assume two operation states consisting of a first operation state to allow the first direction signal to pass therethrough to be outputted as a second direction signal and a second operation state to allow the second direction signal to pass therethrough. The OR circuit 176 has first, second and third terminals 176a, 176b and 176c. The first and third terminals 176a and 176c of the OR circuit 176 are operative to allow the first direction signal from the first buffer circuit 174 to pass therethrough to be outputted as a second direction signal when the first terminal 176a of the OR circuit 176 is operative to receive the first direction signal from the first buffer circuit 174. The second and third terminals 176b and 176c of the OR circuit 176 are operative to allow the second direction signal from the second buffer circuit 175 to pass therethrough when the second terminal 176b of the OR circuit 176 is operative to receive the second direction signal from the second buffer circuit 175.

The joystick 110 is electrically connected at the first terminal 110a and at the first terminal 142a to the speed signal processing unit 142 through a signal transmitting line 151a. The joystick 110 is electrically connected at the second terminal 110b and at the second terminal 142b to the speed signal processing unit 142 through a signal transmitting line 151b. The joystick 110 is electrically connected at the first terminal 110a and at the first terminal 143a to the direction signal processing unit 143 through a signal transmitting line 152a. The joystick 110 is electrically connected at the second terminal 110b and at the second terminal 143b to the direction signal processing unit 143 through a signal transmitting line 152b.

Each of the numerical keys 120 is electrically connected at the first terminal 120a and at the first terminal 141a to the key signal processing unit 141 through a signal transmitting line 153a. Each of the numerical keys 120 is electrically connected at the second terminal 120b and at the second terminal 141b to the key signal processing unit 141 through a signal transmitting line 153c. Each of the numerical keys 120 is electrically connected at the second terminal 120b and at the third terminals 174c and 175c to the first and second buffer circuits 174 and 175 through a signal transmitting line 154. Each of the numerical keys 120 is electrically connected at the third terminal 120c and at the third terminals 171c and 172c to the first and second buffer circuits 171 and 172 through a signal transmitting line 153b.

The key signal processing unit 141 is electrically connected at the third terminal 141c and at the first terminal 171a to the first buffer circuit 171 through a signal transmitting line 144. The speed signal processing unit 142 is electrically connected at the third terminal 142c and at the first terminal 172a to the second buffer circuit 172 through a signal transmitting line 145.

The first buffer circuit 171 is electrically connected at the second terminal 171b and at the first terminal 173a to the OR circuit 173 through a signal transmitting line. The second buffer circuit 172 is electrically connected at the second terminal 172b and at the second terminal 173b to the OR circuit 173 through a signal transmitting line. The OR circuit 173 is electrically connected at the third terminal 173c to the camera unit 300 through a signal transmitting line 155.

The direction signal processing unit 143 is electrically connected at the third terminal 143c and at the first terminal 174a to the first buffer circuit 174 through a signal transmitting line 146. The direction signal processing unit 143 is electrically connected at the fourth terminal 143d and at the first terminal 175a to the second buffer circuit 175 through a signal transmitting line 147.

The first buffer circuit 174 is electrically connected at the second terminal 174b and at the first terminal 176a to the OR circuit 176 through a signal transmitting line. The second buffer circuit 175 is electrically connected at the second terminal 175b and at the second terminal 176b to the OR circuit 176 through a signal transmitting line. The OR circuit 176 is electrically connected at the third terminal 176c to the camera unit 300 through a signal transmitting line 156.

Figure 8:
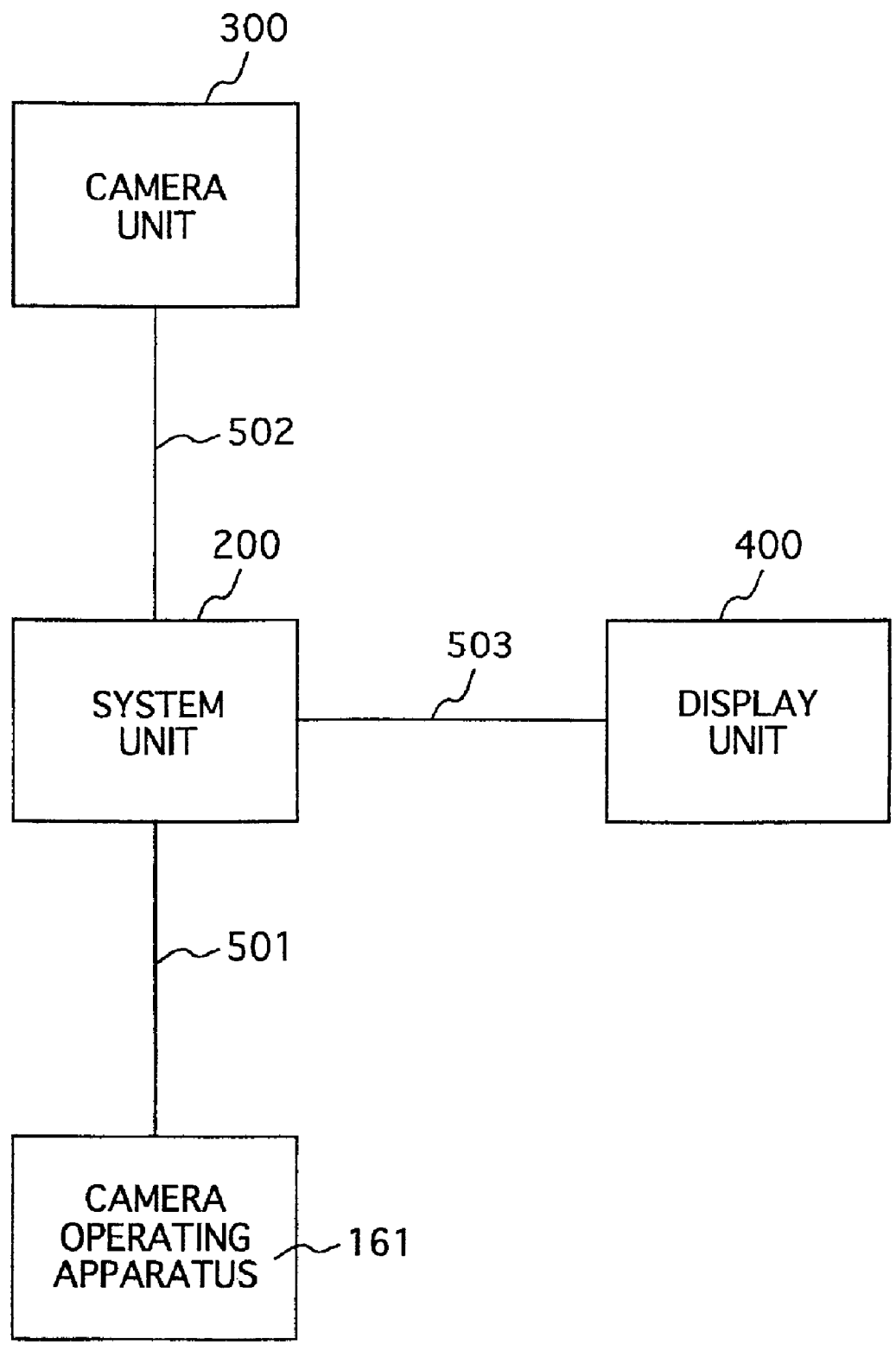
FIG. 8 is a block diagram showing the camera operating apparatus shown in FIG. 7 and a camera unit operatively connected with the camera operating apparatus.

As shown in FIG. 8, the camera operating apparatuses 161 is provided in combination with a surveillance system which comprises a system unit 200, a camera unit 300, a display unit 400 and the camera operating apparatus 161 for operating the camera unit 300 at the operation speed and at the operation direction which are to be changed by the operator. The system unit 200 is electrically connected to the camera operating apparatus 161, the camera unit 300 and the display unit 400 through signal transmitting lines 501, 502 and 503, respectively.

The operation of the camera operating apparatus 161 will be described hereinafter with reference to the drawings shown in FIGS. 4, 7 to 9.

The following description will be directed to the case that the joystick 110 is inclined with respect to the operation surface 103 of the retainer 102 while no numerical key 120 is being pushed by the operator.

When the joystick 110 is inclined with respect to the operation surface 103 of the retainer 102 while no numerical key 120 is being pushed by the operator, the joystick 110 is operative to output the first and second components of the first speed signal in the form of two separate signals in response to the inclination angle of the joystick 110 to the signal transmitting lines 151a and 151b, respectively. The first and second components of the first speed signal are indicative of the operation speeds in the horizontal and vertical directions of the camera unit 300, i.e., the pan and tilt directions of the camera unit 300, respectively.

Further, the inclination of the joystick 110 with respect to the operation surface 103 of the retainer 102 causes the joystick 110 to output the first and second components of the first direction signal in the form of two separate signals in response to the inclination direction of the joystick 110 to the signal transmitting lines 152a and 152b, respectively. The first and second components of the first direction signal are indicative of the operation directions in the horizontal and vertical directions of the camera unit 300, i.e., the pan and tilt directions of the camera unit 300, respectively.

When no numerical key 120 is pushed by the operator, no numerical key 120 thus pushed causes no key signal indicative of the key-pushed action of any one of the numeral keys 120 bearing the numerals "1" to "9" to be outputted to the signal transmitting line 153b.

The first component of the first speed signal outputted to the signal transmitting line 151a is inputted into the speed signal processing unit 142 through the signal transmitting line 151a, while the second component of the first speed signal outputted to the signal transmitting line 151b is inputted into the speed signal processing unit 142 through the signal transmitting line 151b. The first and second components of the first speed signal thus inputted into the speed signal processing unit 142 causes the speed signal processing unit 142 to be operated to generate the first speed signal to be outputted to the signal transmitting line 145.

When no key signal indicative of the key-pushed action of any one of the numeral keys 120 bearing the numerals "1" to "9" outputted to the signal transmitting line 153b is inputted into the second speed signal generating unit 131 through the signal transmitting line 153b, no key signal indicative of the key-pushed action of any one of the numeral keys 120 bearing the numerals "1" to "9" thus inputted into the second speed signal generating unit 131 causes the first speed signal outputted to the signal transmitting line 145 to be outputted to the signal transmitting line 155 as a second speed signal. In this way, the second speed signal generating unit 131 is operative to output the second speed signal indicative of the operation speed which is equal to the operation speed decided by the first speed signal inputted from the joystick 110 to the signal transmitting line 155.

The first component of the first direction signal outputted to the signal transmitting line 152a is inputted into the direction signal processing unit 143 through the signal transmitting line 152a, while the second component of the first direction signal outputted to the signal transmitting line 152b is inputted into the direction signal processing unit 143 through the signal transmitting line 152b. The first and second components of the first direction signal thus inputted into the direction signal processing unit 143 causes the direction signal processing unit 143 to be operated to generate the first direction signal to be outputted to the signal transmitting line 146 as well as to generate the second direction signal to be outputted to the signal transmitting line 147. Here, the second direction signal is indicative of the operation direction which is opposite to the operation direction decided by the first direction signal inputted from the joystick 110.

When no key signal indicative of the key-pushed action of the numeral key 120 bearing the numeral "9" outputted to the signal transmitting line 154 is inputted into the second direction signal generating unit 132 through the signal transmitting line 154, no key signal indicative of the key-pushed action of the numeral key 120 bearing the numeral "9" thus inputted into the second direction signal generating unit 132 causes the first direction signal outputted to the signal transmitting line 146 to be outputted to the signal transmitting line 156 as a second direction signal. In this way, the second direction signal generating unit 132 is operative to output the second direction signal indicative of the operation direction which is equal to the operation direction decided by the first direction signal inputted from the joystick 110 to the signal transmitting line 156.

The second speed signal thus outputted to the signal transmitting line 155 and the second direction signal thus outputted to the signal transmitting line 156 are inputted into the camera unit 300 by way of the signal transmitting line 501, the system unit 200 and the signal transmitting line 502 as shown in FIG. 8.

Form the foregoing description, it will be understood that the joystick 110 inclined with respect to the operation surface 103 of the retainer 102 while no numerical key 120 is being pushed by the operator causes the camera unit 300 to be operated at the operation speed corresponding to the inclination angle of the joystick 110 and at the operation direction corresponding to the inclination direction of the joystick 110.

The following description will be directed to the case that the joystick 110 is inclined with respect to the operation surface 103 of the retainer 102 while one of the numerical keys 120 selected as one specified key for the second operation speed and the second operation direction is being pushed by the operator.

The following description is an example having one of the numerical keys 120 bearing the numerals "1" to "8" pushed by the operator as one specified key selected for the second operation speed and the second operation direction to said camera unit 300.

When the joystick 110 is inclined with respect to the operation surface 103 of the retainer 102 while one of the numerical keys 120 bearing the numerals "1" to "8" is being pushed by the operator, the joystick 110 is operative to output the first and second components of the first speed signal in the form of two separate signals in response to the inclination angle of the joystick 110 to the signal transmitting lines 151a and 151b, respectively. The first and second components of the first speed signal are indicative of the operation speeds in the horizontal and vertical directions of the camera unit 300, i.e., the pan and tilt directions of the camera unit 300, respectively.

Further, the inclination of the joystick 110 with respect to the operation surface 103 of the retainer 102 causes the joystick 110 to output the first and second components of the first direction signal in the form of two separate signals in response to the inclination direction of the joystick 110 to the signal transmitting lines 152a and 152b, respectively. The first and second components of the first direction signal are indicative of the operation directions in the horizontal and vertical directions of the camera unit 300, i.e., the pan and tilt directions of the camera unit 300, respectively.

When one of the numerical keys 120 bearing the numerals "1" to "8" is pushed by the operator as one specified key selected for the second operation speed and the second operation direction to said camera unit 300, the specified key thus pushed causes the key signal indicative of the key-pushed action of the specified key to be outputted to the signal transmitting line 153a and causes the key signal indicative of the key-pushed action of any one of the numeral keys 120 bearing the numerals "1" to "9" to be outputted to the signal transmitting line 153b.

The key signal thus outputted to the signal transmitting line 153a is then inputted into the key signal processing unit 141. With the key signal thus inputted into the key signal processing unit 141, the key signal processing unit 141 is operative to generate a second speed signal indicative of the operation speed corresponding to the numeral represented on the specified key as listed in FIG. 4 to be outputted to the signal transmitting line 144.

The first component of the first speed signal outputted to the signal transmitting line 151a is inputted into the speed signal processing unit 142 through the signal transmitting line 151a, while the second component of the first speed signal outputted to the signal transmitting line 151b is inputted into the speed signal processing unit 142 through the signal transmitting line 151b. The first and second components of the first speed signal thus inputted into the speed signal processing unit 142 causes the speed signal processing unit 142 to be operated to generate the first speed signal to be outputted to the signal transmitting line 145.

When the key signal indicative of the key-pushed action of any one of the numeral keys 120 bearing the numerals "1" to "9" outputted to the signal transmitting line 153b is inputted into the second speed signal generating unit 131 through the signal transmitting line 153b, the key signal indicative of the key-pushed action of any one of the numeral keys 120 bearing the numerals "1" to "9" thus inputted into the second speed signal generating unit 131 causes the second speed signal outputted to the signal transmitting line 144 to be outputted to the signal transmitting line 155. In this way, the second speed signal generating unit 131 is operative to output the second speed signal indicative of the operation speed corresponding to the numeral represented on the specified key as listed in FIG. 4 to the signal transmitting line 155.

The first component of the first direction signal outputted to the signal transmitting line 152a is inputted into the direction signal processing unit 143 through the signal transmitting line 152a, while the second component of the first direction signal outputted to the signal transmitting line 152b is inputted into the direction signal processing unit 143 through the signal transmitting line 152b. The first and second components of the first direction signal thus inputted into the direction signal processing unit 143 causes the direction signal processing unit 143 to be operated to generate the first direction signal to be outputted to the signal transmitting line 146 as well as to generate the second direction signal to be outputted to the signal transmitting line 147. Here, the second direction signal is indicative of the operation direction which is opposite to the operation direction decided by the first direction signal inputted from the joystick 110.

When no key signal indicative of the key-pushed action of the numeral key 120 bearing the numeral "9" outputted to the signal transmitting line 154 is inputted into the second direction signal generating unit 132 through the signal transmitting line 154, no key signal indicative of the key-pushed action of the numeral key 120 bearing the numeral "9" thus inputted into the second direction signal generating unit 132 causes the first direction signal outputted to the signal transmitting line 146 to be outputted to the signal transmitting line 156 as a second direction signal. In this way, the second direction signal generating unit 132 is operative to output the second direction signal indicative of the operation direction which is equal to the operation direction decided by the first direction signal inputted from the joystick 110 to the signal transmitting line 156.

The second speed signal thus outputted to the signal transmitting line 155 and the second direction signal thus outputted to the signal transmitting line 156 are inputted into the camera unit 300 by way of the signal transmitting line 501, the system unit 200 and the signal transmitting line 502 as shown in FIG. 8.

Form the foregoing description, it will be understood that the joystick 110 inclined with respect to the operation surface 103 of the retainer 102 while one of the numerical keys 120 bearing the numerals "1" to "8" is being pushed by the operator causes the camera unit 300 to be operated at the operation speed corresponding to the numeral represented on the specified key and at the operation direction corresponding to the inclination direction of the joystick 110.

The following description is an example having the numerical key 120 bearing the numeral "9" pushed by the operator as one specified key selected for the second operation speed and the second operation direction to said camera unit 300.

When the joystick 110 is inclined with respect to the operation surface 103 of the retainer 102 while the numerical key 120 bearing the numeral "9" is being pushed by the operator, the joystick 110 is operative to output the first and second components of the first speed signal in the form of two separate signals in response to the inclination angle of the joystick 110 to the signal transmitting lines 151a and 151b, respectively. The first and second components of the first speed signal are indicative of the operation speeds in the horizontal and vertical directions of the camera unit 300, i.e., the pan and tilt directions of the camera unit 300, respectively.

Further, the inclination of the joystick 110 with respect to the operation surface 103 of the retainer 102 causes the joystick 110 to output the first and second components of the first direction signal in the form of two separate signals in response to the inclination direction of the joystick 110 to the signal transmitting lines 152a and 152b, respectively. The first and second components of the first direction signal are indicative of the operation directions in the horizontal and vertical directions of the camera unit 300, i.e., the pan and tilt directions of the camera unit 300, respectively.

When the numerical key 120 bearing the numeral "9" is pushed by the operator as one specified key selected for the second operation speed and the second operation direction to said camera unit 300, the specified key thus pushed causes the key signal indicative of the key-pushed action of the specified key to be outputted to the signal transmitting line 153c and 154 and causes the key signal indicative of the key-pushed action of any one of the numeral keys 120 bearing the numerals "1" to "9" to be outputted to the signal transmitting line 153b.

The key signal thus outputted to the signal transmitting line 153c is then inputted into the key signal processing unit 141. With the key signal thus inputted into the key signal processing unit 141, the key signal processing unit 141 is operative to generate a second speed signal indicative of the operation speed corresponding to the numeral "1" as listed in FIG. 4 to be outputted to the signal transmitting line 144.

The first component of the first speed signal outputted to the signal transmitting line 151a is inputted into the speed signal processing unit 142 through the signal transmitting line 151a, while the second component of the first speed signal outputted to the signal transmitting line 151b is inputted into the speed signal processing unit 142 through the signal transmitting line 151b. The first and second components of the first speed signal thus inputted into the speed signal processing unit 142 causes the speed signal processing unit 142 to be operated to generate the first speed signal to be outputted to the signal transmitting line 145.

When the key signal indicative of the key-pushed action of any one of the numeral keys 120 bearing the numerals "1" to "9" outputted to the signal transmitting line 153b is inputted into the second speed signal generating unit 131 through the signal transmitting line 153b, the key signal indicative of the key-pushed action of any one of the numeral keys 120 bearing the numerals "1" to "9" thus inputted into the second speed signal generating unit 131 causes the second speed signal outputted to the signal transmitting line 144 to be outputted to the signal transmitting line 155. In this way, the second speed signal generating unit 131 is operative to output the second speed signal indicative of the operation speed corresponding to the numeral "1" as listed in FIG. 4 to the signal transmitting line 155.

The first component of the first direction signal outputted to the signal transmitting line 152a is inputted into the direction signal processing unit 143 through the signal transmitting line 152a, while the second component of the first direction signal outputted to the signal transmitting line 152b is inputted into the direction signal processing unit 143 through the signal transmitting line 152b. The first and second components of the first direction signal thus inputted into the direction signal processing unit 143 causes the direction signal processing unit 143 to be operated to generate the first direction signal to be outputted to the signal transmitting line 146 as well as to generate the second direction signal to be outputted to the signal transmitting line 147. Here, the second direction signal is indicative of the operation direction which is opposite to the operation direction decided by the first direction signal inputted from the joystick 110.

When the key signal indicative of the key-pushed action of the numeral key 120 bearing the numeral "9" outputted to the signal transmitting line 154 is inputted into the second direction signal generating unit 132 through the signal transmitting line 154, the key signal indicative of the key-pushed action of the numeral key 120 bearing the numeral "9" thus inputted into the second direction signal generating unit 132 causes the second direction signal outputted to the signal transmitting line 147 to be outputted to the signal transmitting line 156. In this way, the second direction signal generating unit 132 is operative to output the second direction signal indicative of the operation direction which is opposite to the operation direction decided by the first direction signal inputted from the joystick 110 to the signal transmitting line 156.

The second speed signal thus outputted to the signal transmitting line 155 and the second direction signal thus outputted to the signal transmitting line 156 are inputted into the camera unit 300 by way of the signal transmitting line 501, the system unit 200 and the signal transmitting line 502 as shown in FIG. 8.

Form the foregoing description, it will be understood that the joystick 110 inclined with respect to the operation surface 103 of the retainer 102 while the numerical key 120 bearing the numeral "9" is being pushed by the operator causes the camera unit 300 to be operated at the operation speed corresponding to the numeral "1" and at the operation direction opposite to the operation direction corresponding to the inclination direction of the joystick 110.

As will be seen from the above description, the present embodiment of the camera operating apparatus according to the preset invention can control the operation speed of the camera unit 300 at a constant level corresponding to the numeral represented on the specified key. This leads to the fact that the camera unit 300 can be operated with a minute action and can enhance the efficiency of the surveillance operation by the camera unit 300 when the camera unit 300 has an operation angle range designated by the operator under the "AUTOPAN" function having the camera unit 300 perform a reciprocation motion in the range of a predetermined angle, or otherwise when the camera unit 300 has a motion path designated by the operator under the "PATROL" function having an operation direction range, a zooming range, a focusing range and the other memorized therein to perform the various motions of the camera unit in line with the memorized functions.

Though the camera operating apparatus 161 is shown in FIG. 8 as being separated from the system unit 200, the camera operating apparatus 161 exemplified by the present invention may have the system unit 200 assembled therein to control the operation speeds and the operation directions to the camera unit. This means that the system unit 200 is assembled in the camera operating apparatus 161 as shown in FIG. 9.

According to the present invention, the numerical keys 120 bearing the respective numerals "1" to "8" may be assigned with respective desired speed signals indicative of the operation speeds to the camera unit 300 designated by the operator as there is no need to have the numerals represented on the numerical keys fixedly corresponding to the operation speeds to the camera unit 300 predetermined by the operator. For example, it is possible that the operation speed "8" highest in speed is assigned to the numerical key bearing the numeral "1", and the operation speed "1" lowest in speed is assigned to the numerical key bearing the numeral "2", while no operation speeds are assigned to the remaining numerical keys. It is thus to be noted that any operation speed is assigned to any desired key selected and designated by the operator according to the present invention.

Similarly, the operation direction to the camera unit 300 assigned to the numerical key 120 bearing the numeral "9" is selected and set by the operator. For example, it is possible that the joystick 110 inclined while the numerical key 120 bearing the numeral "9" is being pushed causes the camera unit 300 to be operated in a operation direction deviated at 90 degrees from the operation direction under which the joystick 110 is inclined with respect to the operation surface 103 of the retainer 102.

From the foregoing description, it will be understood that the camera operating apparatus according to the present invention can easily perform the minute operation of the camera unit in the operation speed and the operation direction by means of the joystick operated by the operator together with the specified key selected by the operator.

What is claimed is:

1. A camera operating apparatus for operating at least one camera unit at first and second operation speeds and at an operation direction which are to be changed by an operator, comprising:

a retainer having an operation surface;

a joystick mounted on said retainer and having a center axis and a center point located on said center axis, said joystick being pivotable around said center point of said joystick at a variable inclination angle between said center axis of said joystick and said operation surface of said retainer to input a first speed signal indicative of said inclination angle varied in response to said first operation speed to said camera unit;

a plurality of keys each operatively arranged on said retainer to perform a key-pushed action and a key-released action, each of said keys being operative to input a key signal indicative of said key-pushed action, said keys including one specified key selected for said second operation speed to said camera unit desired by said operator; and output signal generating means for generating a second speed signal indicative of said second operation speed to said camera unit based on said first speed signal from said joystick and said key signal from said specified key, said output signal generating means being operative to output said second speed signal to said camera unit to ensure said second operation speed to said camera unit desired by said operator.

2. A camera operating apparatus as set forth in claim 1, in which said second speed signal generated by said output signal generating means indicates an operation speed to said camera unit which is equal to an operation speed to said camera unit decided by said key signal inputted from said specified key.

3. A camera operating apparatus for operating at least one camera unit at first and second operation directions and at an operation speed which are to be changed by an operator, comprising:

a retainer having an operation surface;

a joystick mounted on said retainer and having a center axis and a center point located on said center axis, said joystick being pivotable around said center point of said joystick at a variable inclination direction with respect to said operation surface of said retainer to input a first direction signal indicative of said inclination direction varied in response to said first operation direction to said camera unit;

a plurality of keys each operatively arranged on said retainer to perform a key-pushed action and a key-released action, each of said keys being operative to input a key signal indicative of said key-pushed action, said keys including one specified key selected for said second operation direction to said camera unit desired by said operator; and output signal generating means for generating a second direction signal indicative of said second operation direction to said camera unit based on said first direction signal from said joystick and said key signal from said specified key, said output signal generating means being operative to output said second direction signal to said camera unit to ensure said second operation direction to said camera unit desired by said operator.

4. A camera operating apparatus as set forth in claim 3, in which said second direction signal generated by said output signal generating means indicates an operation direction to said camera unit which is opposite to an operation direction to said camera unit decided by said first direction signal inputted from said joystick with respect to said center point of said joystick.

5. A camera operating apparatus as set forth in any one of claims 1 to 4, in which said keys include a plurality of numerical keys which are selectively operated to input said key signals.

6. A camera operating apparatus for operating at least one camera unit at first and second operation speeds and at first and second operation directions which are to be changed by an operator, comprising:

a retainer having an operation surface;

a joystick mounted on said retainer and having a center axis and a center point located on said center axis, said joystick being pivotable around said center point of said joystick at a variable inclination angle between said center axis of said joystick and said operation surface of said retainer to input a first speed signal indicative of said inclination angle varied in response to said first operation speed to said camera unit and at a variable inclination direction with respect to said operation surface of said retainer to input a first direction signal indicative of said inclination direction varied in response to said first operation direction to said camera unit, said joystick having a first terminal having said first speed signal outputted therethrough and a second terminal having said first direction signal outputted therethrough;

a plurality of keys each operatively arranged on said retainer to perform a key-pushed action and a key-released action, each of said keys being operative to input a key signal indicative of said key-pushed action, said keys including one specified key selected for said second operation speed and said second operation direction to said camera unit desired by said operator, said keys having first and second terminals having said key signal outputted therethrough; and output signal generating means for generating and outputting a second speed signal indicative of said second operation speed to said camera unit and a second direction signal indicative of said second operation direction to said camera unit, said output signal generating means including a second speed signal generating unit for generating said second speed signal based on said first speed signal from said joystick and said key signal from said specified key and a second direction signal generating unit for generating said second direction signal based on said first direction signal from said joystick and said key signal from said specified key, said second speed signal generating unit being operative to output said second speed signal to said camera unit to ensure said second operation speed to said camera unit desired by said operator, said second speed signal generating unit having a first terminal having said first speed signal inputted therethrough, a second terminal having said key signal inputted therethrough and a third terminal having said second speed signal outputted therethrough, said second direction signal generating unit being operative to output said second direction signal to said camera unit to ensure said second operation direction to said camera unit desired by said operator, said second direction signal generating unit having a first terminal having said first direction signal inputted therethrough, a second terminal having said key signal inputted therethrough and a third terminal having said second direction signal outputted therethrough.

7. A camera operating apparatus as set forth in claim 6, in which said second speed signal generated by said second speed signal generating unit of said output signal generating means indicates an operation speed to said camera unit which is equal to an operation speed to said camera unit decided by said key signal inputted from said specified key.

8. A camera operating apparatus as set forth in claim 6, in which said second direction signal generated by said second direction signal generating unit of said output signal generating means indicates an operation direction to said camera unit which is opposite to an operation direction to said camera unit decided by said first direction signal inputted from said joystick with respect to said center point of said joystick.

9. A camera operating apparatus as set forth in any one of claims 6 to 8, in which said keys include a plurality of numerical keys which are selectively operated to input said key signals.

10. A camera operating apparatus for operating at least one camera unit at first and second operation speeds and at first and second operation directions which are to be changed by an operator, comprising:

a retainer having an operation surface;

a joystick mounted on said retainer and having a center axis and a center point located on said center axis, said joystick being pivotable around said center point of said joystick at a variable inclination angle between said center axis of said joystick and said operation surface of said retainer to input a first speed signal indicative of said inclination angle varied in response to said first operation speed to said camera unit and at a variable inclination direction with respect to said operation surface of said retainer to input a first direction signal indicative of said inclination direction varied in response to said first operation direction to said camera unit, said first speed signal consisting of first and second components, said first direction signal consisting of first and second components, said joystick having a first terminal having said first component of said first speed signal and first component of said first direction signal outputted therethrough and a second terminal having said second component of said first speed signal and said second component of said first direction signal outputted therethrough;

a plurality of keys each operatively arranged on said retainer to perform a key-pushed action and a key-released action, each of said keys being operative to input a key signal indicative of said key-pushed action, said keys including one specified key selected for said second operation speed and said second operation direction to said camera unit desired by said operator, said keys having first, second and third terminals having said key signal outputted therethrough; and output signal generating means for generating and outputting a second speed signal indicative of said second operation speed to said camera unit and a second direction signal indicative of said second operation direction to said camera unit, said output signal generating means including a second speed signal generating unit for generating said second speed signal based on said first and second components of said first speed signal from said joystick and said key signal from said specified key and a second direction signal generating unit for generating said second direction signal based on said first and second components of said first direction signal from said joystick and said key signal from said specified key, said second speed signal generating unit being operative to output said second speed signal to said camera unit to ensure said second operation speed to said camera unit desired by said operator, said second speed signal generating unit having a key signal processing unit for processing said key signal from said specified key to output said second speed signal, a speed signal processing unit for processing and synthesizing said first and second components of said first speed signal from said joystick to output said first speed signal, a first buffer circuit being operative to assume two operation states consisting of a first operation state to allow said second speed signal to pass therethrough and a second operation state not to allow said second speed signal to pass therethrough, a second buffer circuit being operative to assume two operation states consisting of a first operation state to allow said first speed signal to pass therethrough and a second operation state not to allow said first speed signal to pass therethrough and an OR circuit being operative to assume two operation states consisting of a first operation state to allow said second speed signal to pass therethrough and a second operation state to allow said first speed signal to pass therethrough to be outputted as a second speed signal, said key signal processing unit having first and second terminals having said key signal inputted therethrough and a third terminal having said second speed signal outputted therethrough, said speed signal processing unit having a first terminal having said first component of said first speed signal inputted therethrough, a second terminal having said second component of said first speed signal inputted therethrough and a third terminal having said first speed signal outputted therethrough, said first buffer circuit having first, second and third terminals, said first and second terminals of said first buffer circuit being operative to allow said second speed signal from said key signal processing unit to pass therethrough when said third terminal of said first buffer circuit is operative to receive said key signal from said specified key and operative not to allow said second speed signal from said key signal processing unit to pass therethrough when said third terminal of said first buffer circuit is operative not to receive said key signal from said specified key, said second buffer circuit having first, second and third terminals, said first and second terminals of said second buffer circuit being operative to allow said first speed signal from said speed signal processing unit to pass therethrough when said third terminal of said second buffer circuit is operative not to receive said key signal from said specified key and operative not to allow said first speed signal from said speed signal processing unit to pass therethrough when said third terminal of said first buffer circuit is operative to receive said key signal from said specified key, said OR circuit having first, second and third terminals, said first and third terminals of said OR circuit being operative to allow said second speed signal from said first buffer circuit to pass therethrough when said first terminal of said OR circuit is operative to receive said second speed signal from said first buffer circuit, said second and third terminals of said OR circuit being operative to allow said first speed signal from said second buffer circuit to pass therethrough to be outputted as a second speed signal when said second terminal of said OR circuit is operative to receive said first speed signal from said second buffer circuit, said second direction signal generating unit being operative to output said second direction signal to said camera unit to ensure said second operation direction to said camera unit desired by said operator, said second direction signal generating unit having a direction signal processing unit for processing and synthesizing said first and second components of said first direction signal from said joystick to output said first and second direction signals, a first buffer circuit being operative to assume two operation states consisting of a first operation state to allow said first direction signal to pass therethrough and a second operation state not to allow said first direction signal to pass therethrough, a second buffer circuit being operative to assume two operation states consisting of a first operation state to allow said second direction signal to pass therethrough and a second operation state not to allow said second direction signal to pass therethrough and an OR circuit being operative to assume two operation states consisting of a first operation state to allow said first direction signal to pass therethrough to be outputted as a second direction signal and a second operation state to allow said second direction signal to pass therethrough, said direction signal processing unit having a first terminal having said first component of said first direction signal inputted therethrough, a second terminal having said second component of said first direction signal inputted therethrough, a third terminal having said first direction signal outputted therethrough and a fourth terminal having said second direction signal outputted therethrough, said first buffer circuit having first, second and third terminals, said first and second terminals of said first buffer circuit being operative to allow said first direction signal from said direction signal processing unit to pass therethrough when said third terminal of said first buffer circuit is operative not to receive said key signal from said specified key and operative not to allow said first direction signal from said direction signal processing unit to pass therethrough when said third terminal of said first buffer circuit is operative to receive said key signal from said specified key, said second buffer circuit having first, second and third terminals, said first and second terminals of said second buffer circuit being operative to allow said second direction signal from said direction signal processing unit to pass therethrough when said third terminal of said second buffer circuit is operative to receive said key signal from said specified key and operative not to allow said second direction signal from said direction signal processing unit to pass therethrough when said third terminal of said first buffer circuit is operative not to receive said key signal from said specified key, said OR circuit having first, second and third terminals, said first and third terminals of said OR circuit being operative to allow said first direction signal from said first buffer circuit to pass therethrough to be outputted as a second direction signal when said first terminal of said OR circuit is operative to receive said first direction signal from said first buffer circuit, said second and third terminals of said OR circuit being operative to allow said second direction signal from said second buffer circuit to pass therethrough when said second terminal of said OR circuit is operative to receive said second direction signal from said second buffer circuit.

11. A camera operating apparatus as set forth in claim 10, in which said second speed signal generated by said key signal processing unit of said second speed signal generating unit indicates an operation speed to said camera unit which is equal to an operation speed to said camera unit decided by said key signal inputted from said specified key.

12. A camera operating apparatus as set forth in claim 10, in which said second direction signal generated by said direction signal processing unit of said second direction signal generating unit indicates an operation direction to said camera unit which is opposite to an operation direction to said camera unit decided by said first direction signal inputted from said joystick with respect to said center point of said joystick.

13. A camera operating apparatus as set forth in any one of claims 10 to 12, in which said keys include a plurality of numerical keys which are selectively operated to input said key signals.

* * * * *